United States Patent
Kojima

(10) Patent No.: US 9,294,968 B2
(45) Date of Patent: Mar. 22, 2016

(54) BASE STATION DEVICE, MOBILE TERMINAL, COMMUNICATION SYSTEM, AND RADIO COMMUNICATION METHOD

(75) Inventor: Yuji Kojima, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 713 days.

(21) Appl. No.: 13/473,176

(22) Filed: May 16, 2012

(65) Prior Publication Data

US 2012/0225682 A1     Sep. 6, 2012

Related U.S. Application Data

(63) Continuation of application No. PCT/JP2009/070428, filed on Dec. 4, 2009.

(51) Int. Cl.
*H04W 88/00* (2009.01)
*H04W 36/00* (2009.01)
*H04W 48/16* (2009.01)

(52) U.S. Cl.
CPC .......... *H04W 36/0055* (2013.01); *H04W 48/16* (2013.01)

(58) Field of Classification Search
CPC ..... H04W 88/00; H04W 48/20; H04W 68/00; H04W 36/00; H04W 84/12
USPC ................... 455/507, 525, 458, 436; 370/338
See application file for complete search history.

(56) References Cited

U.S. PATENT DOCUMENTS

| | | | | | |
|---|---|---|---|---|---|
| 5,317,623 | A | * | 5/1994 | Sakamoto | H04B 7/022 455/436 |
| 5,408,514 | A | * | 4/1995 | Sakamoto | H04B 7/022 370/332 |
| 5,590,133 | A | * | 12/1996 | Billstrom | H04W 48/20 370/332 |

(Continued)

FOREIGN PATENT DOCUMENTS

| | | |
|---|---|---|
| EP | 1 835 779 A2 | 9/2007 |
| GB | 2 397 469 A | 1/2003 |

(Continued)

OTHER PUBLICATIONS

International Search Report with written observation, issued for corresponding Japanese Patent Application No. PCT/JP2009/070428 mailed Mar. 2, 2010 with English translation.

(Continued)

*Primary Examiner* — Hai V Nguyen
(74) *Attorney, Agent, or Firm* — Myers Wolin, LLC

(57) ABSTRACT

A base station device characterized by including: a transmission portion that broadcast-transmits identification information indicating a first cell to a mobile terminal in an idle mode under control of the base station device; and a reception portion that receives information indicating a destination cell that the mobile terminal in the idle mode transmits when moving between cells; wherein when the base station device is a base station device forming a second cell adjacent to the first cell, the reception unit receives information indicating the second cell from the mobile terminal in the idle mode which has received the identification information indicating the first cell transmitted from another base station device forming the first cell, and receives information indicating the first cell from the mobile terminal in the idle mode which has received the identification information indicating the first cell transmitted from the base station device.

14 Claims, 24 Drawing Sheets

(56) References Cited

U.S. PATENT DOCUMENTS

| | | | | | |
|---|---|---|---|---|---|
| 5,732,330 | A * | 3/1998 | Anderson | H03D 7/16 | 455/112 |
| 5,870,685 | A * | 2/1999 | Flynn | H02J 7/0011 | 320/128 |
| 5,930,706 | A * | 7/1999 | Raith | H04W 68/00 | 340/7.35 |
| 5,930,721 | A * | 7/1999 | Fried | H04W 48/18 | 455/437 |
| 6,088,591 | A * | 7/2000 | Trompower | H04B 1/7143 | 370/331 |
| 6,112,084 | A * | 8/2000 | Sicher | H04W 76/02 | 370/337 |
| 6,138,019 | A * | 10/2000 | Trompower | H04B 1/7143 | 455/432.3 |
| 6,434,389 | B1 * | 8/2002 | Meskanen | H04W 48/20 | 455/436 |
| 6,681,115 | B1 * | 1/2004 | McKenna | H04W 4/08 | 340/7.46 |
| 6,697,415 | B1 * | 2/2004 | Mahany | H04B 1/406 | 375/130 |
| 6,826,414 | B1 * | 11/2004 | Reynolds | H04W 48/02 | 455/432.1 |
| 6,859,654 | B1 * | 2/2005 | Reynolds | H04W 24/00 | 455/437 |
| 6,963,745 | B2 * | 11/2005 | Singh | H04W 36/0066 | 455/436 |
| 7,039,413 | B2 * | 5/2006 | Masuda | H04W 36/14 | 455/412.2 |
| 7,050,452 | B2 * | 5/2006 | Sugar | H04W 16/14 | 370/208 |
| 7,072,663 | B2 * | 7/2006 | Ramos | H04W 16/14 | 455/436 |
| 7,076,258 | B2 * | 7/2006 | Motegi | H04W 60/04 | 370/236.1 |
| 7,133,702 | B2 * | 11/2006 | Amerga | H04B 1/70753 | 375/E1.009 |
| 7,187,934 | B2 * | 3/2007 | Turina | H04W 16/06 | 370/331 |
| 7,545,825 | B2 * | 6/2009 | Zhu | H04L 12/189 | 370/312 |
| 7,634,272 | B2 * | 12/2009 | Yamashita | H04W 36/04 | 455/432.1 |
| 7,805,155 | B2 * | 9/2010 | Chapman | H04W 36/30 | 455/126 |
| 7,912,494 | B2 * | 3/2011 | Funnell | H04W 36/24 | 370/331 |
| 7,966,017 | B2 * | 6/2011 | Kim | H04W 36/08 | 370/328 |
| 7,978,645 | B2 * | 7/2011 | Koo | H04W 36/0083 | 370/328 |
| 8,000,706 | B2 * | 8/2011 | Lee | H04J 11/0093 | 455/435.1 |
| 8,126,499 | B2 * | 2/2012 | Tenny | H04W 36/30 | 455/115.1 |
| 8,150,413 | B2 * | 4/2012 | Aoyama | H04W 16/18 | 455/453 |
| 8,170,556 | B2 * | 5/2012 | Lee | H04W 60/04 | 370/329 |
| 8,200,228 | B2 * | 6/2012 | Peisa | H04W 36/0094 | 370/331 |
| 8,213,957 | B2 * | 7/2012 | Bull | G01S 5/02 | 370/328 |
| 8,265,685 | B2 * | 9/2012 | Vikberg | H04J 11/0093 | 455/410 |
| 8,295,209 | B2 * | 10/2012 | Chindapol | H04B 7/2621 | 370/210 |
| 8,340,669 | B2 * | 12/2012 | Jeong | H04W 48/10 | 370/332 |
| RE43,891 | E * | 1/2013 | Golden | B60R 25/018 | 340/426.11 |
| 8,364,151 | B2 * | 1/2013 | Iwamura | H04W 60/04 | 370/310 |
| 8,374,152 | B2 * | 2/2013 | Aoyama | H04W 48/20 | 370/331 |
| 8,391,141 | B2 * | 3/2013 | Rune | H04W 48/06 | 370/230 |
| 8,451,784 | B2 * | 5/2013 | Ness | H04W 48/20 | 370/329 |
| 8,467,798 | B2 * | 6/2013 | Lee | H04W 36/22 | 455/450 |
| 8,554,266 | B2 * | 10/2013 | Funnell | H04W 36/24 | 370/331 |
| 8,588,773 | B2 * | 11/2013 | Deshpande | H04J 11/0093 | 370/328 |
| 8,588,778 | B2 * | 11/2013 | Majmundar | H04W 24/04 | 370/329 |
| 8,644,259 | B2 * | 2/2014 | Somasundaram | | 370/332 |
| 8,666,318 | B2 * | 3/2014 | Kumar | H04L 1/08 | 370/332 |
| 8,687,486 | B2 * | 4/2014 | Rune | H04W 48/06 | 370/230 |
| 8,737,295 | B2 * | 5/2014 | Horn | H04L 63/104 | 370/328 |
| 8,805,366 | B2 * | 8/2014 | Uemura | H04W 76/027 | 370/328 |
| 8,812,049 | B2 * | 8/2014 | Brisebois | H04W 52/244 | 370/318 |
| 9,094,935 | B2 * | 7/2015 | Uemura | H04W 76/027 | |
| 2002/0028690 | A1 * | 3/2002 | McKenna | H04W 4/08 | 455/517 |
| 2002/0197992 | A1 * | 12/2002 | Nizri | H04W 60/04 | 455/435.1 |
| 2003/0003921 | A1 * | 1/2003 | Laakso | H04W 52/343 | 455/453 |
| 2003/0026242 | A1 * | 2/2003 | Jokinen | H04W 48/12 | 370/350 |
| 2003/0050078 | A1 * | 3/2003 | Motegi | H04W 60/04 | 455/456.1 |
| 2003/0153317 | A1 * | 8/2003 | Friman | H04W 48/18 | 455/446 |
| 2004/0043769 | A1 * | 3/2004 | Amerga | H04W 36/30 | 455/437 |
| 2005/0090278 | A1 * | 4/2005 | Jeong | H04W 36/0055 | 455/525 |
| 2005/0202828 | A1 * | 9/2005 | Pecen | H04W 36/0055 | 455/453 |
| 2006/0014544 | A1 * | 1/2006 | Tolli | H04W 36/22 | 455/453 |
| 2006/0068780 | A1 * | 3/2006 | Dalsgaard | H04W 48/10 | 455/432.3 |
| 2006/0128394 | A1 | 6/2006 | Turina et al. | | |
| 2007/0086395 | A1 * | 4/2007 | Bakshi | H04W 68/02 | 370/338 |
| 2008/0004025 | A1 * | 1/2008 | Lee | H04W 48/16 | 455/437 |
| 2008/0090573 | A1 * | 4/2008 | Kim | H04W 36/08 | 455/436 |
| 2008/0200171 | A1 * | 8/2008 | Jeong | H04J 11/0093 | 455/436 |
| 2008/0242301 | A1 * | 10/2008 | Osterling | H04W 36/08 | 455/436 |
| 2009/0047958 | A1 * | 2/2009 | Rimhagen | H04J 11/0093 | 455/436 |
| 2009/0088171 | A1 * | 4/2009 | Aoyama | H04W 16/18 | 455/446 |
| 2009/0103501 | A1 * | 4/2009 | Farrag | H04W 74/02 | 370/337 |
| 2009/0129327 | A1 * | 5/2009 | Horn | H04L 63/104 | 370/329 |
| 2009/0137251 | A1 * | 5/2009 | Ji | H04W 36/22 | 455/437 |
| 2009/0163223 | A1 * | 6/2009 | Casey | H04W 36/22 | 455/453 |
| 2009/0168727 | A1 * | 7/2009 | Somasundaram | H04J 11/0069 | 370/332 |
| 2009/0170510 | A1 * | 7/2009 | Kim | H04W 36/30 | 455/434 |
| 2009/0181676 | A1 * | 7/2009 | Lee | H04J 11/0093 | 455/436 |
| 2010/0029274 | A1 * | 2/2010 | Deshpande | H04J 11/0093 | 455/435.3 |
| 2010/0069021 | A1 * | 3/2010 | Echensperger | H04W 36/12 | 455/99 |

(56) References Cited

U.S. PATENT DOCUMENTS

| | | | | |
|---|---|---|---|---|
| 2010/0159917 A1* | 6/2010 | Majmundar | ........... | H04W 24/04 455/423 |
| 2010/0216464 A1* | 8/2010 | Funnell | ................ | H04W 36/24 455/434 |
| 2010/0222006 A1* | 9/2010 | Peisa | ................ | H04W 36/0094 455/67.7 |
| 2010/0222055 A1* | 9/2010 | Cho | ................ | H04J 11/0086 455/434 |
| 2010/0240367 A1* | 9/2010 | Lee | ................ | H04W 36/0077 455/435.2 |
| 2010/0272004 A1* | 10/2010 | Maeda | ................ | H04L 5/0007 370/312 |
| 2010/0273504 A1* | 10/2010 | Bull | ................ | G01S 5/02 455/456.1 |
| 2010/0278146 A1* | 11/2010 | Aoyama | ................ | H04W 48/20 370/331 |
| 2010/0291927 A1* | 11/2010 | Wu | ................ | H04W 48/20 455/435.3 |
| 2010/0297999 A1* | 11/2010 | Iwamura | ................ | H04W 60/04 455/440 |
| 2010/0317349 A1* | 12/2010 | Serravalle | ........... | H04W 60/00 455/440 |
| 2010/0331027 A1* | 12/2010 | Kumar | ................ | H04L 1/08 455/501 |
| 2011/0044253 A1* | 2/2011 | Zisimopoulos | ....... | H04W 48/16 370/328 |
| 2011/0053597 A1* | 3/2011 | Lee | ................ | H04W 36/22 455/436 |
| 2011/0098042 A1* | 4/2011 | Mach | ................ | H04W 48/20 455/435.1 |
| 2011/0110520 A1* | 5/2011 | Ness | ................ | H04W 48/20 380/270 |
| 2011/0124330 A1* | 5/2011 | Kojima | ................ | H04W 36/32 455/424 |
| 2011/0136489 A1* | 6/2011 | Funnell | ................ | H04W 36/24 455/436 |
| 2011/0177813 A1* | 7/2011 | Uemura | ................ | H04W 76/027 455/435.1 |
| 2011/0207487 A1* | 8/2011 | Yang | ................ | H04W 4/18 455/507 |
| 2012/0009972 A1* | 1/2012 | Viering | ................ | H04W 36/22 455/525 |
| 2012/0276945 A1* | 11/2012 | Chindapol | ........... | H04W 48/20 455/525 |
| 2013/0225178 A1* | 8/2013 | Kojima | ................ | H04W 36/245 455/437 |
| 2014/0119270 A1* | 5/2014 | Zhang | ................ | H04J 11/0069 370/312 |
| 2014/0342737 A1* | 11/2014 | Uemura | ................ | H04W 76/027 455/435.2 |

FOREIGN PATENT DOCUMENTS

| | | | | |
|---|---|---|---|---|
| GB | 2 397 469 A | 7/2004 | | |
| JP | 2004-200789 | 7/2004 | | |
| JP | 2008-172373 | 7/2008 | | |
| JP | 2008-523711 | 7/2008 | | |
| JP | 2009-212847 | 9/2009 | | |
| KR | WO 2009025494 A2 * | 2/2009 | ........... | H04W 36/22 |
| WO | 2007/060808 | 5/2007 | | |
| WO | 2009-025494 A2 | 2/2009 | | |
| WO | WO 2009025494 A2 * | 2/2009 | ........... | H04W 36/22 |
| WO | 2009-054702 A1 | 4/2009 | | |

OTHER PUBLICATIONS

Extended European Search Report, issued for corresponding European Patent Application No. 09851870.7 mailed Jul. 17, 2014.

Communication pursuant to Article 94(3) EPC issued for corresponding European Patent Application No. 09 851 870.7 dated Aug. 5, 2015.

* cited by examiner

BASE STATION DEVICE, MOBILE TERMINAL, COMMUNICATION SYSTEM, AND RADIO COMMUNICATION METHOD

CROSS-REFERENCE TO RELATED APPLICATION

This application is a continuation of and claims priority to International Patent Application No. PCT/JP2009/070428 filed on Dec. 4, 2009, subject matter of these patent documents is incorporated by reference herein in its entirety.

FIELD

A certain aspect of the embodiments is related to a base station device, a mobile terminal, a communication system, and a radio communication method.

BACKGROUND

In mobile terminals of a mobile communication system, there are a mobile terminal in an active mode which is communicating (e.g. which has established connection) with a base station, and a mobile terminal in an idle mode which is waiting for communication (e.g. which does not establish connection) with the base station. The mobile terminal in the active mode and the mobile terminal in the active mode measure reception quality concerning serving cells of the mobile terminals and neighboring cells. The mobile terminal in the active mode performs handover based on the measured reception quality, the mobile terminal in the idle mode performs cell selection based on the measured reception quality, and they move between the cells.

With respect to the mobile terminal in the active mode, there is known a technique relevant to moving a mobile terminal to a suitable cell according to a load state of each cell (e.g. International Publication Pamphlet No. WO 2007/060808). With respect to the mobile terminal in the idle mode, there is also known a technique relevant to moving a mobile terminal to a suitable cell according to a load state of each cell (e.g. Japanese Laid-open Patent Publication No. 2008-172373, and Japanese National Publication of International Patent Application No. 2008-523711).

SUMMARY

According to an aspect of the present invention, there is provided a base station device including: a transmission portion that broadcast-transmits identification information indicating a first cell to a mobile terminal in an idle mode under control of the base station device; and a reception portion that receives information indicating a destination cell that the mobile terminal in the idle mode transmits when moving between cells; wherein when the base station device is a base station device forming a second cell adjacent to the first cell, the reception unit receives information indicating the second cell from the mobile terminal in the idle mode which has received the identification information indicating the first cell transmitted from another base station device forming the first cell, and receives information indicating the first cell from the mobile terminal in the idle mode which has received the identification information indicating the first cell transmitted from the base station device.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

Figure 1:
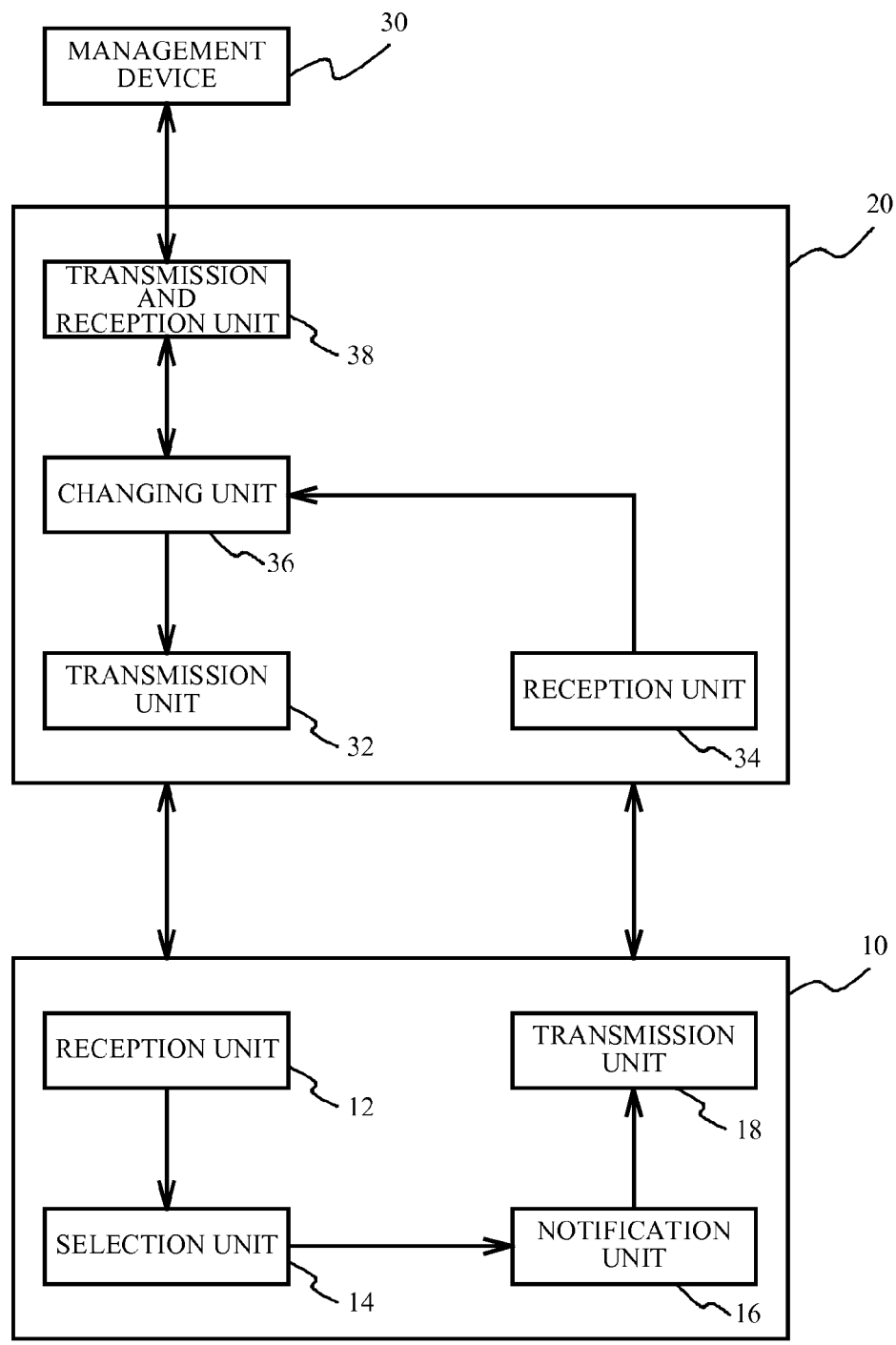
FIG. 1 is a block diagram of a mobile terminal and a base station device according to a first embodiment.

A description will be given of embodiments of the invention, with reference to drawings.

Embodiment 1

A description will be given of LTE (Long Term Evolution) which is a type of a radio communication method of 3GPP (3rd Generation Partnership Project). A mobile terminal (UE: User Equipment Mobile Station) in an active mode measures reception quality of transmission radio waves of a serving cell being in communication and neighboring cells around the serving cell, and reports a result of the measurement to a base station. The base station selects an optimal cell based on comparison of the reception quality, and notifies the mobile terminal of the selected cell. The mobile terminal performs the handover to the selected cell. A mobile terminal in an idle mode receives a signal intermittently transmitted from the respective base stations of the serving cell and the neighboring cells, and measures reception quality. The mobile terminal performs cell selection based on a cell ranking criterion defined by the reception quality, and moves to the selected cell.

The movement between cells by the mobile terminal in the idle mode is performed based on the cell ranking criterion of the serving cell and the neighboring cells. Calculating the cell ranking criterion is performed based on various parameters used for an evaluation formula (hereinafter referred to as "a cell selection evaluation formula") for calculating the reception quality of a transmission radio wave of each cell and the cell ranking criterion. An example of the cell selection evaluation formula is indicated below. The cell selection evaluation formula of the serving cell is expressed by a formula 1.

$$Rs = Q\text{means}, s + Q\text{hyst} \qquad \text{(formula 1)}$$

Here, the "Rs" is the cell ranking criterion of the serving cell. The "Qmeans, s" is, for example, a value of RSRP (Reference Signal Received Power) concerning the serving cell measured by the mobile terminal, and corresponds to the reception quality. The "Qhyst" is hysteresis, and is for controlling frequent movement near the boundary of the cell.

The cell selection evaluation formula of the cell that neighbors the serving cell is expressed by a formula 2.

$$Rn = Q\text{means}, n - Q\text{offset} \qquad \text{(formula 2)}$$

Here, the "Rn" is the cell ranking criterion of the neighboring cell. The "Qmeans, n" is, for example, a value of RSRP concerning the neighboring cell measured by the mobile terminal. The "Qoffset" is an offset.

For example, in the LTE, standardization of SON (Self-Optimization Network) which automatically optimizes various operational control parameters such as the parameters of the cell selection evaluation formulas of the formulas 1 and 2 is performed. A description will be given of the case where the load of the cell is optimized by changing the parameters of the cell selection evaluation formulas.

When the cell ranking criterion Rn of the neighboring cell is larger than the cell ranking criterion Rs of the serving cell for a fixed period, the mobile terminal moves from the serving cell to the neighboring cell. By changing the parameters with the use of the hysteresis and the offset in the formulas 1 and 2 as the parameters, the movement of the mobile terminal between the cells can be controlled. For example, if the offset of a certain cell is made small, the mobile terminal is guided to the cell. Here, the parameters are broadcasted from the base station to the mobile terminal in the cell at predetermined cycles.

The mobile terminal in the active mode also can perform hand-over between cells independently of the idle mode based on the same evaluation formulas as the formulas 1 and 2. In the active mode, to distribute the load of the cell, the parameters in the base station can be changed at any time, and the mobile terminal can be guided from the high load cell to a low load cell.

In the first embodiment, the mobile terminal in the idle mode is also guided from a first cell in which the load should be reduced, to a second cell (hereinafter referred to as "the neighboring cell") that neighbors the first cell. Here, the first cell is the high load cell with a high load, for example. An index of the load of the cell can be set to at least one of a used amount of a radio zone of the base station which forms the cell, a memory usage in the base station, and a used amount of a CPU (Central Processing Unit) of the base station, for example.

FIG. 1 is a block diagram of a mobile terminal 10 and a base station device 20 according to the first embodiment. The mobile terminal 10 includes a reception unit 12, a selection unit 14, a notification unit 16 and a transmission unit 18. The reception unit 12 receives, from the base station device 20, parameters used in order that the mobile terminal 10 in the idle mode selects the cell, for example. In addition, when the self-terminal is in the idle mode, the reception unit 12 receives identification information indicative of the first cell from the base station device 20. The selection unit 14 selects a destination cell based on the parameters. The notification unit 16 notifies the base station device 20 of information indicative of the destination cell selected by the selection unit 14. The transmission unit 18 transmits a signal to the base station device 20. Here, the parameters are the hysteresis and the offset in the formulas 1 and 2 which are the cell selection evaluation formulas, for example.

The base station device 20 includes a transmission unit 32, a reception unit 34, a changing unit 36, and a transmission and reception unit 38. The transmission unit 32 transmits parameters used in order that the mobile terminal 10 in the idle mode selects the cell, to the mobile terminal 10 for example. In addition, the transmission unit 32 broadcast-transmits the identification information indicative of the first cell to the mobile terminal 10 in the idle mode under control of the base station device 20. The reception unit 34 receives, from the mobile terminal 10, the information indicative of the destination cell transmitted when the mobile terminal in the idle mode moves between the cells. The changing unit 36 changes the parameters. The transmission and reception unit 38 transmits and receives a signal to/from the management device 30. It is noted that the base station device 20 is also called base station.

The management device 30 manages the number of mobile terminals in the active mode for each cell and for each position registration range, the number of mobile terminals in the idle mode which stride the boundary between the high load cell and the neighboring cells, and the number of mobile terminals in the idle mode for each position registration range. Moreover, the management device 30 manages the number of mobile terminals in the active mode which has moved between the cells, and the number of mobile terminals in the idle mode which has moved so as to stride the boundary between the high load cell and the neighboring cells.

Figure 2:
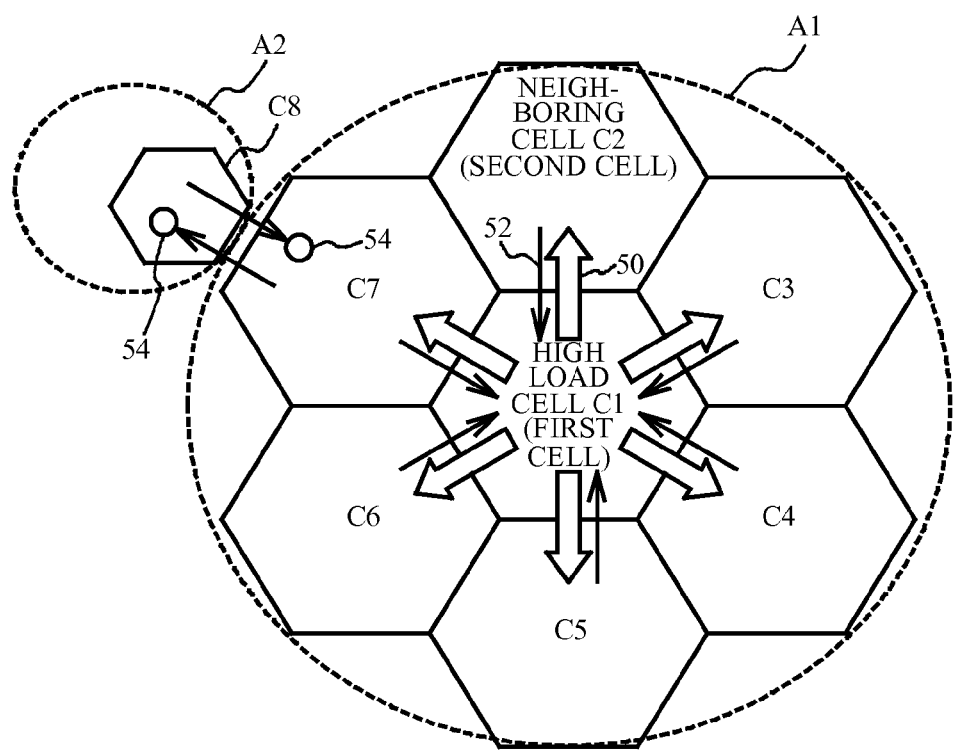
FIG. 2 is a diagram illustrating movement of the mobile terminal in an idle mode between cells.

FIG. 2 is a diagram illustrating movement of the mobile terminal in the idle mode between cells. Cells C2 to C7 neighbor the high load cell C1 in which the load should be reduced. A position registration range A1 includes the cells C1 to C7. The mobile terminal 10 in the idle mode does not notify the base station of movement of the cell as a principle, with respect to movement in the same position registration range A1. The cell C8 neighboring the cell C7 is included in a position registration range A2 different from the position registration range A1. Therefore, when the mobile terminal 10 in the idle mode moves between the cells C7 and C8, the mobile terminal 10 notifies the base station of the information indicative of the destination cell in the destination cell. White circles 54 in the drawing indicate that movement between cells is notified.

Figure 3:
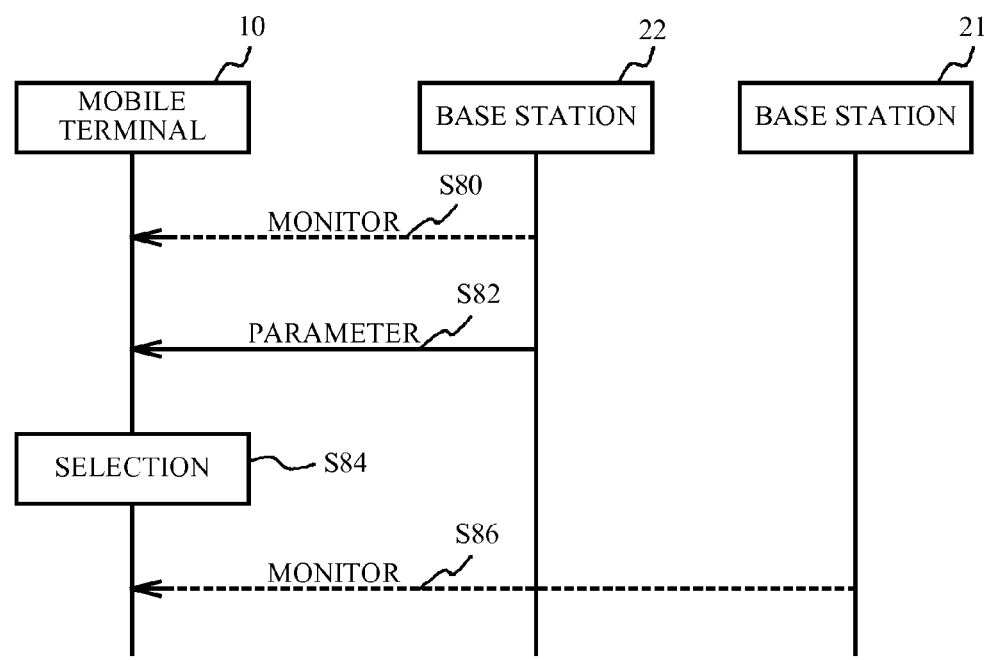
FIG. 3 is a sequence diagram illustrating processes of base stations and the mobile terminal when the mobile terminal moves in the same position registration range.

FIG. 3 is a sequence diagram illustrating processes of base stations and the mobile terminal when the mobile terminal moves in the same position registration range. A base station 22 forms the cell C2, and a base station 21 forms the cell C1. The cell C2 is the serving cell of the mobile terminal 10, and the mobile terminal 10 is going to move to the cell C1. First, the reception unit 12 of the mobile terminal intermittently monitors a signal from the base station 22 (step S80). In the idle mode, the connection between the mobile terminal 10 and the base station is not established. The transmission unit 32 of the base station 22 transmits parameters used in order that the mobile terminal 10 selects a cell, and the reception unit 12 of the mobile terminal 10 receives the parameters (step S82). The selection unit 14 of the mobile terminal 10 calculates the cell ranking criterion of each cell with the formulas 1 and 2, for example, based on the parameters received by the reception unit 12, and selects the destination cell (step S84). The notification unit 16 of the mobile terminal 10 moves from the cell C2 to the cell C1 without notifying the base stations 21 and 22 of the destination cell. Since the mobile terminal 10 has moved the cell, the reception unit 12 of the mobile terminal 10 intermittently monitors a signal from the base station 21 (step S86).

Figure 4:
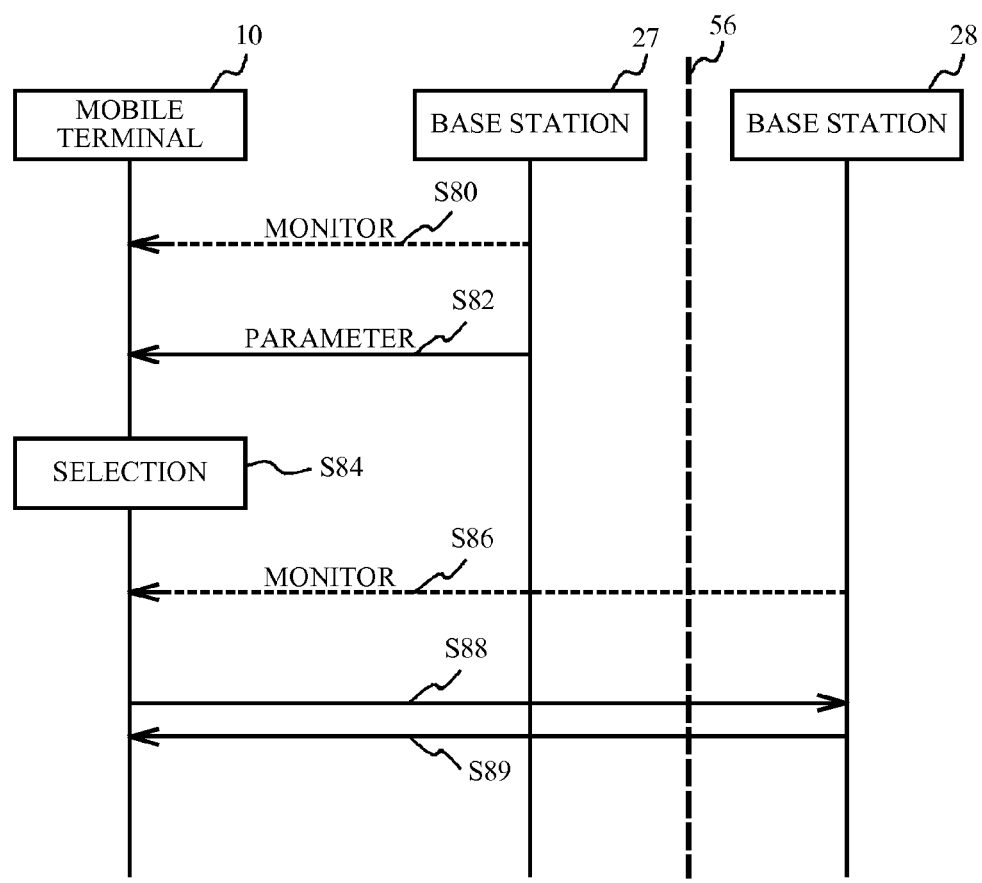
FIG. 4 is a sequence diagram of processes of the base station which strides across the position registration range, and the mobile terminal.

FIG. 4 is a sequence diagram of processes of the base station which strides across the position registration range, and the mobile terminal. The base station 27 forms the cell C7, and the base station 28 forms the cell C8. A boundary between the cells C7 and C8 is a boundary 56 of the position registration range. The cell C7 is included in the position registration range A1, and the cell C8 is included in the different position registration range A2. The cell C7 is the serving cell of the mobile terminal 10, and the mobile terminal 10 is going to move to the cell C8. In Steps S80 to S86, the same process as FIG. 3 is performed. Then, the notification unit 16 of the mobile terminal 10 notifies the base station 28 of information indicative of the destination cell C8 via the transmission unit 18 (step S88). That is, the notification unit 16 notifies the base station 28 that the selection unit 14 has selected the cell C8 and the mobile terminal 10 has moved to the cell C8. The transmission unit 32 of the base station 28 performs a response indicative of having received the notification, to the reception unit 12 of the mobile terminal 10 (step S89). It is noted that steps S88 and S89 can be performed based on a well-known position registration process, for example.

As described above, even when the mobile terminal moves to a cell in the same position registration range A1, the notification unit 16 of the mobile terminal 10 in the idle mode does not essentially notify the base station of information indicative of the destination cell C1 (FIG. 3). On the contrary, when the mobile terminal 10 moves to the cell in the different position registration range, the notification unit 16 notifies the base station of information indicative of the destination cell C8 (FIG. 4). Thereby, the management device 30 can acquire information on the movement of the mobile terminal 10 from the base station, and comprehend the position of the mobile terminal 10 for each position registration range.

Next, a description will be given of load sharing of the base station in the first embodiment. Returning to FIG. 2, in the first embodiment, the movement of the mobile terminal from the high load cell C1 to the neighboring cells C2 to C7 is advanced as illustrated by white arrows 50 in FIG. 2. On the contrary, the movement of the mobile terminal from the neighboring cells C2 to C7 to the high load cell C1 is restrained as illustrated by arrows 52. Thereby, the load of the high load cell C1 can be reduced.

To properly perform the load sharing, it is desirable that the base station 21 comprehends the mobile terminal 10 in the idle mode which moves so as to stride the boundary between the high load cell C1 and the neighboring cells C2 to C7. Therefore, when the mobile terminal 10 moves so as to stride the boundary between the high load cell C1 and the neighboring cells C2 to C7, the notification unit 16 notifies the base station device 20 of information indicative of the destination cell even when the mobile terminal 10 is in the idle mode.

Figure 5:
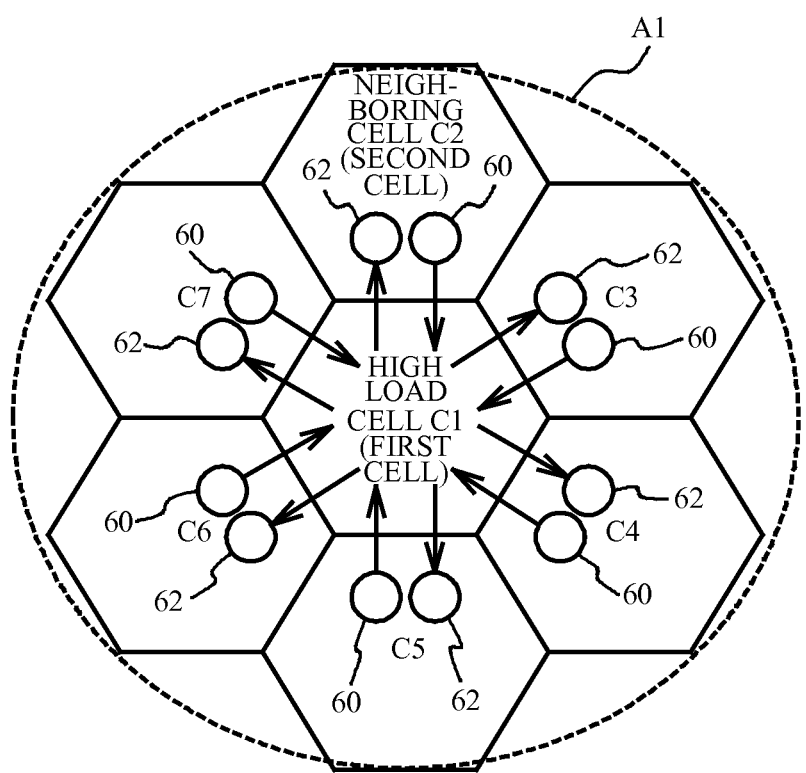
FIG. 5 is a diagram illustrating the mobile terminal which strides a boundary between a high load cell and neighboring cells.

FIG. 5 is an example of the mobile terminal 10 which strides the boundary between the high load cell C1 and the neighboring cells C2 to C7. In FIG. 5, arrows between the high load cell C1 and the neighboring cells C2 to C7 indicate the movement of the mobile terminal 10. When the mobile terminal 10 moves from the neighboring cells C2 to C7 to the high load cell C1, the notification unit 16 notifies the base station in the serving cell of information indicative of the destination cell C1 before the mobile terminal 10 moves to the high load cell C1 (white circles 60 in FIG. 5). On the contrary, when the mobile terminal 10 moves from the high load cell C1 to the neighboring cells C2 to C7, the notification unit 16 notifies the base station in the destination cell of information indicative of the destination cells C2 to C7 after the mobile terminal 10 moves to the neighboring cells C2 to C7 (white circles 62 in FIG. 5).

Figure 6:
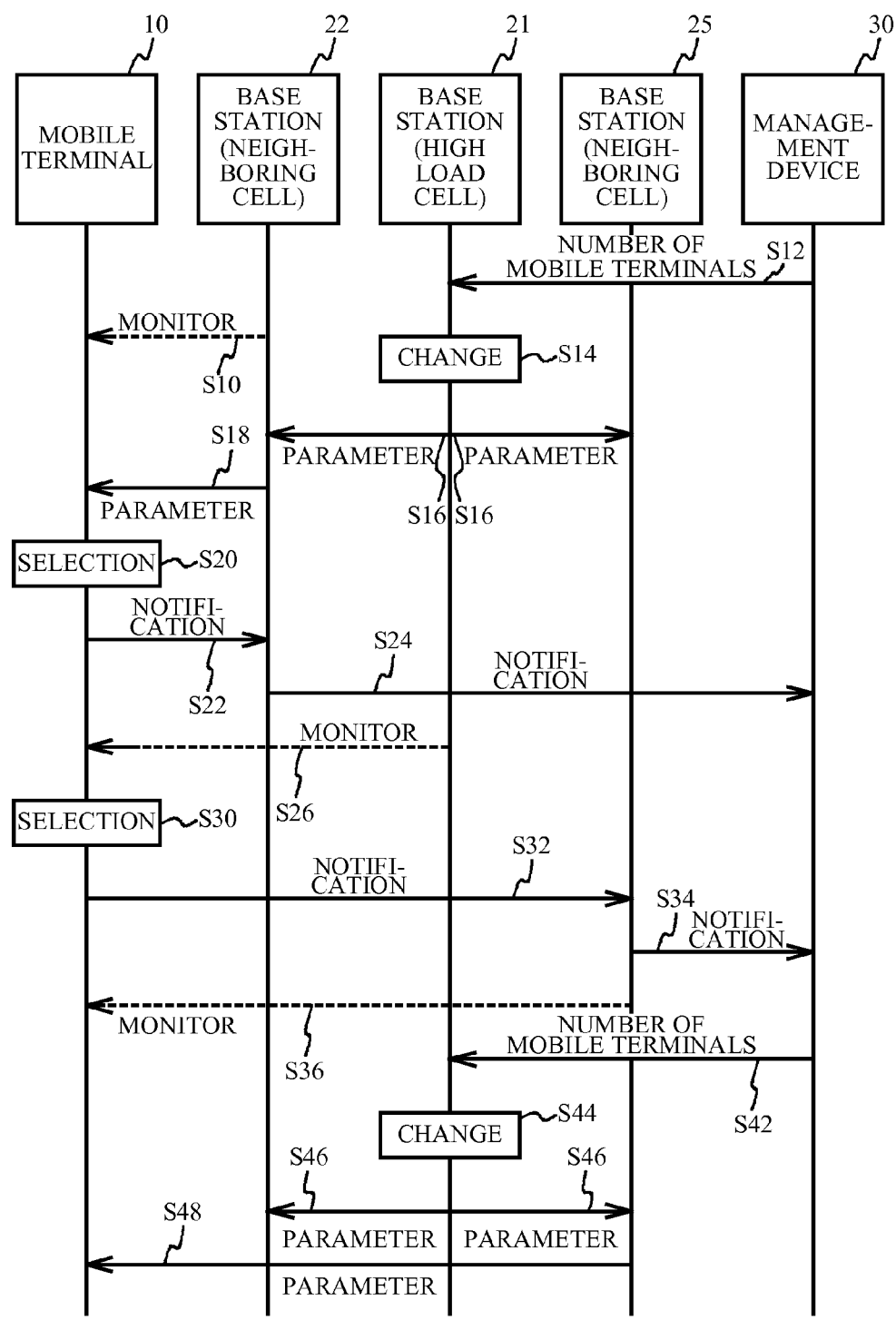
FIG. 6 is a sequence diagram of the mobile terminal, the base stations and a management device according to the first embodiment.

FIG. 6 is a sequence diagram of the mobile terminal, the base stations and the management device according to the first embodiment. The base station 22 forms the cell C2, the base station forms the cell C1, and the base station forms the cell C5. The cell C1 is the high load cell in which the load should be reduced. The cells C2 and C5 are the neighboring cells adjacent to the high load cell.

The reception unit 12 of the mobile terminal 10 intermittently receives a signal from the base station 22 in the serving cell C2 (step S10). The management device 30 transmits the number of mobile terminals in the active mode and the idle mode which move between the high load cell and each neighboring cell, to the transmission and reception unit 38 of the base station 21 (step S12). The changing unit 36 of the base station 21 changes parameters based on the number of mobile terminals received from the management device 30 (step S14). For example, the changing unit 36 changes values of the hysteresis and the offset in the formulas 1 and 2. The base station 21 transmits the changed parameters to the base stations 22 and 25 (step S16). The transmission unit 32 of the base station 22 transmits the changed parameters, and the reception unit 12 of the mobile terminal 10 receives the changed parameters (step S18).

The selection unit 14 of the mobile terminal 10 selects the destination cell C1 based on the parameters received by the reception unit 12 (step S20). For example, calculates the cell ranking criterion based on the formulas 1 and 2, and selects the destination cell based on the cell ranking criterion. The notification unit 16 of the mobile terminal 10 transmits information indicative of the destination cell C1 to the reception unit 34 of the base station 22 via the transmission unit 18 before the mobile terminal 10 moves to the cell C1 (step S22). The base station 22 transmits the information indicative of the destination cell C1 to the management device 30 (step S24). Since the mobile terminal 10 move to the cell C1, the reception unit 12 of the mobile terminal 10 intermittently receives a signal from the base station 21 (step S26).

Next, when the mobile terminal 10 moves in the inside of the cell C1 and approaches the cell C5, the selection unit 14 of the mobile terminal 10 selects the destination cell C5 based on parameters (step S30). The notification unit 16 of the mobile terminal 10 notifies the base station 25 of information indicative of the destination cell C5 via the transmission unit 18 after the mobile terminal 10 moves to the cell C5 (step S32). The base station 25 transmits the information indicative of the destination cell C5 to the management device 30 (step S34). Since the mobile terminal 10 move to the cell C5, the reception unit 12 of the mobile terminal 10 intermittently receives a signal from the base station 25 (step S36).

Here, as is the case with step S12, the management device 30 transmits the number of mobile terminals in the active mode and the idle mode which move between the high load cell and each neighboring cell, to the transmission and reception unit 38 of the base station 21 (step S42). The base station 21 changes parameters based on the number of mobile terminals (step S44). The base station 21 transmits the changed parameters to the base stations 22 and 25 (step S46). The base station 25 transmits the changed parameters to the mobile terminal 10 (step S48).

It is noted that timing when the management device 30 transmits the number of mobile terminals to the base station 21 and timing when the base station 21 changes the parameters may be arbitrary. For example, the transmission and the changing may be performed whenever the movement of the mobile terminal 10 in the idle mode is notified from the base station 20. The transmission and the changing may be performed at regular intervals. At least one of base station devices may serve as the management device 30.

According to the first embodiment, when the base station device itself is a base station device (e.g. base station 22) forming the second cell (e.g. C2) which neighbors the first cell C1, the reception unit 34 receives the information indicative of the second cell from the mobile terminal in the idle mode that has received the identification information indicative of the first cell transmitted from a base station device (base station 21) forming the first cell (white circles 62), as illustrated in FIG. 5. In addition, the reception unit 34 receives the information indicative of the first cell from the mobile terminal in the idle mode that has received the identification information indicative of the first cell transmitted from the base station device itself (white circles 60).

According to the first embodiment, when the serving cell is the high load cell C1 and the destination cell is the neighboring cell C5, the notification unit 16 of the mobile terminal 10 notifies the base station device 20 (base station 25) of the information indicative of the destination cell C5 after the mobile terminal 10 moves to the neighboring cell C5, as illustrated in FIG. 5. The reception unit 34 of the base station device 20 receives the notification. On the contrary, when the serving cell is the neighboring cell C2 and the destination cell is the high load cell C1, the notification unit 16 notifies the base station device 20 (base station 22) of the information indicative of the destination cell C1 before the mobile terminal 10 moves to the high load cell C1. The reception unit 34 of the base station device 20 receives the notification.

Thereby, the base station 21 of the high load cell C1 in which the load should be reduced does not receive the notification from the mobile terminal 10 in the idle mode, and hence the load of the base station 21 can be reduced. In addition, the base station 21 can comprehend the movement of the mobile terminal 10 in the idle mode between the high load cell C1 and the neighboring cells C2 and C5 via the management device 30. Therefore, the changing unit 36 of the base station device 20 can change the parameters based on the information indicative of the destination cell. As a result, the load of the high load cell C1 can be reduced more adequately.

Embodiment 2

Figure 7:
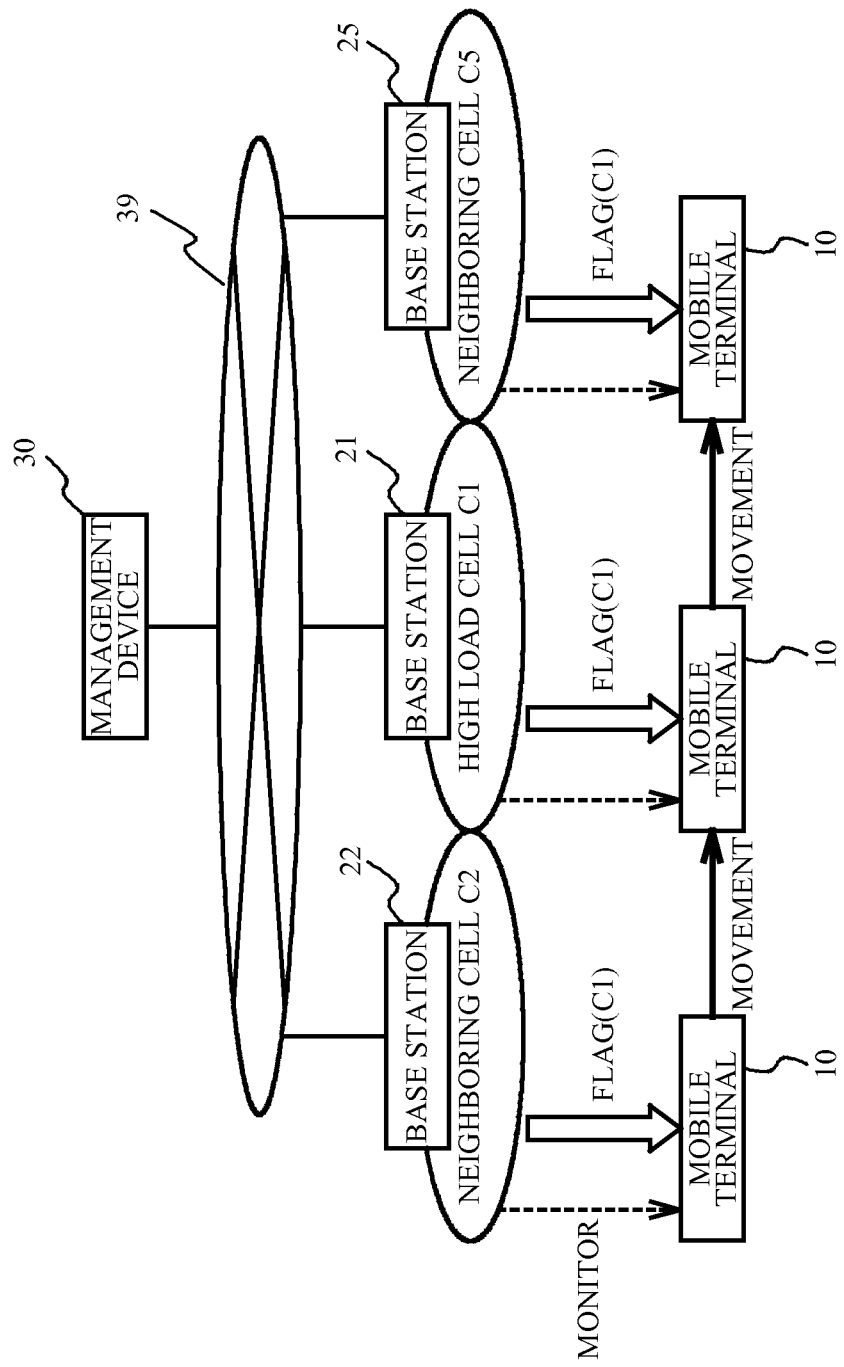
FIG. 7 is a block diagram of a communication system according to a second embodiment.

A second embodiment is an example in which the process of the first embodiment is performed using a flag. FIG. 7 is a block diagram of a communication system according to the second embodiment. The base stations 22, 21, and 25 form the cell C2, C1, and C5, respectively. The cell C1 is the high load cell in which the load should be reduced. The cells C2 and C5 are the neighboring cells which neighbor the high load cell C1. The base stations 22, 21 and 25 are connected to the management device 30 via a backbone network 39. The mobile terminal 10 in the idle mode intermittently monitors a signal from each base station (base station 22, 21 or 25) forming the serving cell. In addition, the mobile terminal 10 receives a flag from the base station in the serving cell. The flag includes identification information indicative of the high load cell C1. Here, the flag may be transmitted from the base station in the high load cell and the neighboring cells, or from only the base station in the high load cell.

Figure 8:
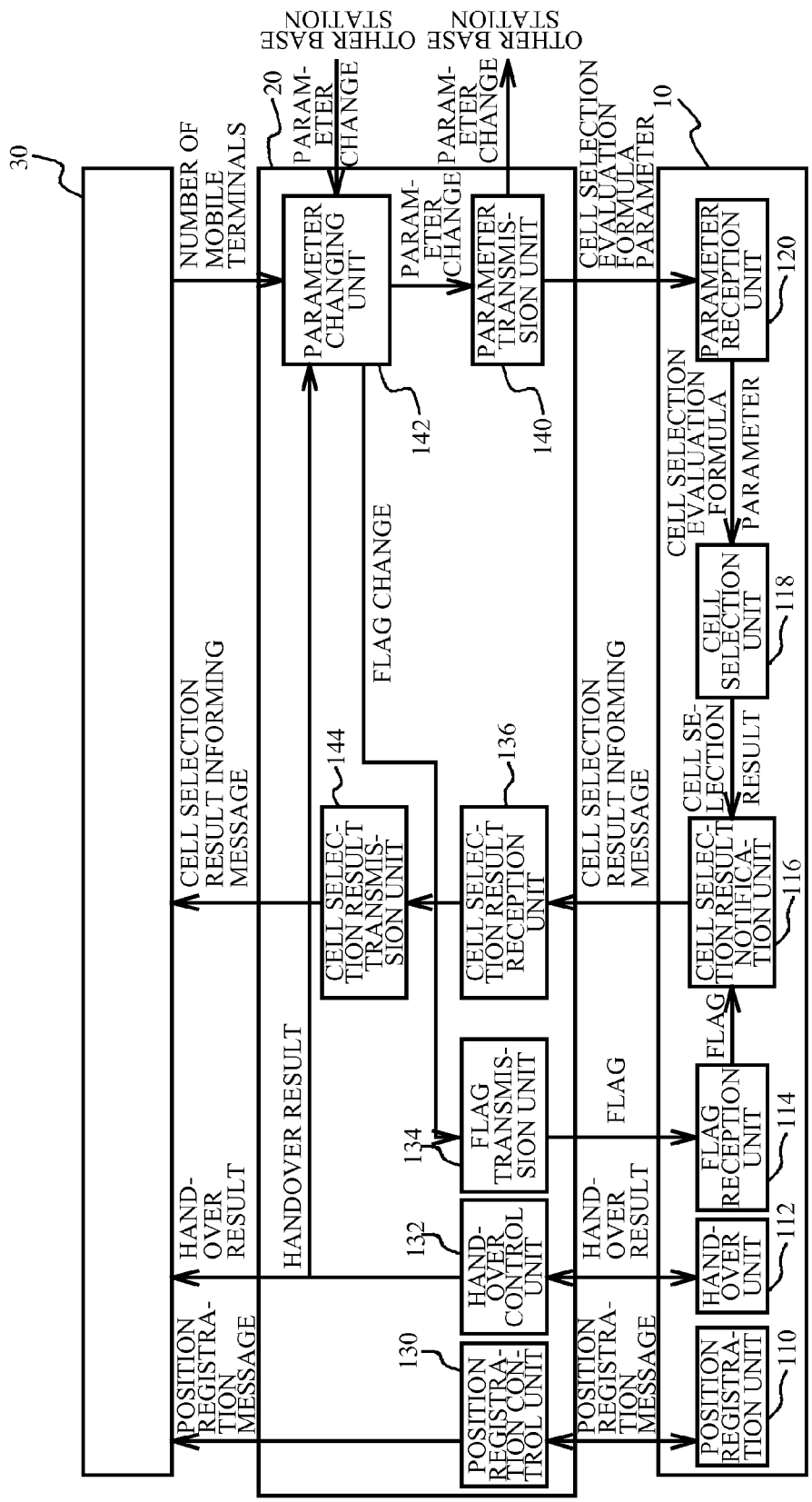
FIG. 8 is a block diagram of the base station device and the mobile terminal according to the second embodiment.

FIG. 8 is a block diagram of the base station device 20 and the mobile terminal 10 according to the second embodiment. As illustrated in FIG. 8, the mobile terminal 10 includes a position registration unit 110, a handover unit 112, a flag reception unit 114, a cell selection result notification unit 116, a cell selection unit 118, and a parameter reception unit 120. The reception unit 12 of FIG. 1 corresponds to the flag reception unit 114 and the parameter reception unit 120, for example. The selection unit 14 of FIG. 1 corresponds to the cell selection unit 118, for example. The notification unit 16 of FIG. 1 corresponds to the cell selection result notification unit 116, for example.

The base station device 20 includes a position registration control unit 130, a handover control unit 132, a flag transmission unit 134, and a cell selection result reception unit 136. The base station device 20 further includes a parameter transmission unit 140, a cell selection result transmission unit 144, and a parameter changing unit 142. The transmission unit 32 of FIG. 1 corresponds to the flag transmission unit 134 and the parameter transmission unit 140, for example. The reception unit 34 of FIG. 1 corresponds to the cell selection result reception unit 136, for example. The changing unit 36 of FIG. 1 corresponds to the parameter changing unit 142.

The position registration unit 110 of the mobile terminal 10 transmits the position of the mobile terminal 10 in the idle mode as a position registration message for each position registration range to the position registration control unit 130 of the base station device 20. The position registration control unit 130 transmits the position registration message of the mobile terminal 10 to the management device 30. Thereby, the management device 30 can manage the position registration range to which the mobile terminal 10 belongs.

In the case of the active mode, the handover unit 112 of the mobile terminal 10 performs the handover according to a handover message from the handover control unit 132 of the base station device 20. The handover unit 112 requests the handover control unit 132 to perform the handover. The handover control unit 132 notifies the handover unit 112 of a result of the handover (a handover destination cell), and notifies the management device 30 of the result of the handover about the mobile terminal 10. Thereby, the management device 30 can manage a cell to which the mobile terminal in the active mode belongs.

The flag reception unit 114 of the mobile terminal 10 receives the flag from the flag transmission unit 134 of the base station device 20. The parameter reception unit 120 of the mobile terminal 10 receives the parameters for the cell selection evaluation formulas from the parameter transmission unit 140 of the base station device 20. The cell selection unit 118 of the mobile terminal 10 selects a cell based on the parameters for the cell selection evaluation formulas and the reception quality. The cell selection result notification unit 116 of the mobile terminal 10 transmits a cell selection result informing message to the cell selection result reception unit 136 based on the flag which the flag reception unit 114 has received, and the selection result of the cell which the cell selection unit 118 has selected. The cell selection evaluation formulas correspond to the formulas 1 and 2. The cell selection result transmission unit 144 transmits the cell selection result informing message which the cell selection result reception unit 136 has received, to the management device 30. Thereby, the management device 30 can manage the cell to which the mobile terminal in the idle mode belongs.

The parameter changing unit 142 receives the number of mobile terminals from the management device 30 and the change of the parameters from another base station, and changes the parameters for the cell selection evaluation formulas. The parameter transmission unit 140 transmits the changed parameters for the cell selection evaluation formulas to the parameter reception unit 120.

Figure 9:
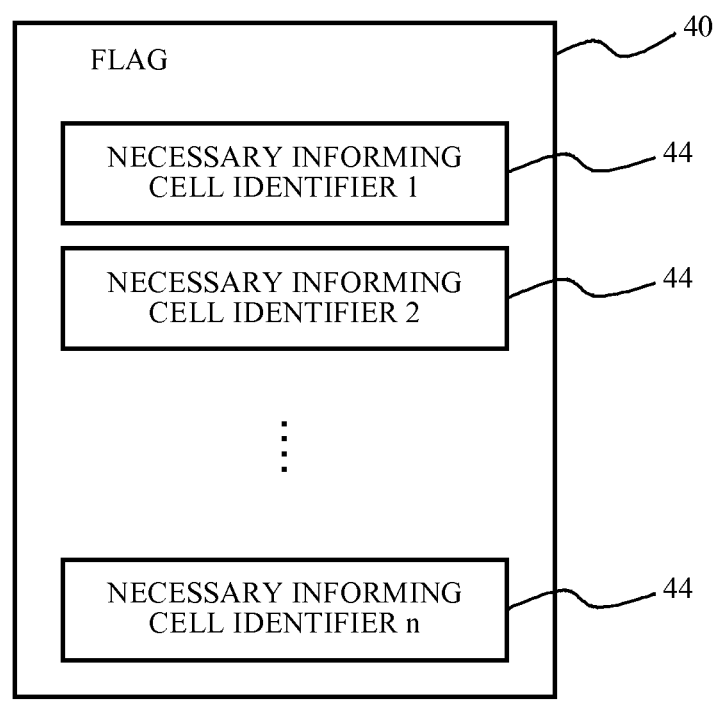
FIG. 9 is a diagram illustrating an example of a flag which a transmission unit of the base station device transmits to a reception unit of the mobile terminal.

FIG. 9 is a diagram illustrating an example of the flag which the transmission unit 32 of the base station device 20 transmits to the reception unit 12 of the mobile terminal 10. When the cell of the base station itself is the high load cell, a flag 40 includes identification information indicative of the cell of the base station itself as a necessary informing cell identifier 44. When the cell which the base station itself forms is the neighboring cell to the high load cell, the flag 40 includes identification information indicative of the high load cell as the necessary informing cell identifier 44. The flag 40 can include one or more necessary informing cell identifier 44.

Figure 10:
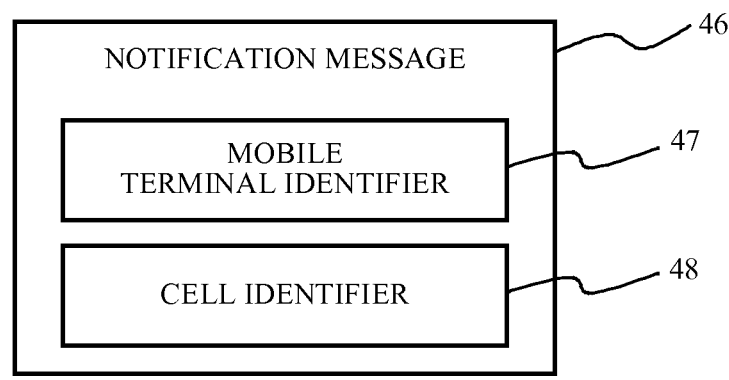
FIG. 10 is a diagram illustrating an example of a notification message of which a notification unit of the mobile terminal notifies a reception unit of the base station device.

FIG. 10 is a diagram illustrating an example of a notification message 46 of which the notification unit 16 of the mobile terminal 10 notifies the reception unit 34 of the base station device 20. The notification message 46 is the cell selection result informing message of FIG. 8, for example. The notification message 46 includes an identifier 47 of the mobile terminal 10, and an identifier 48 of the destination cell.

Figure 11:
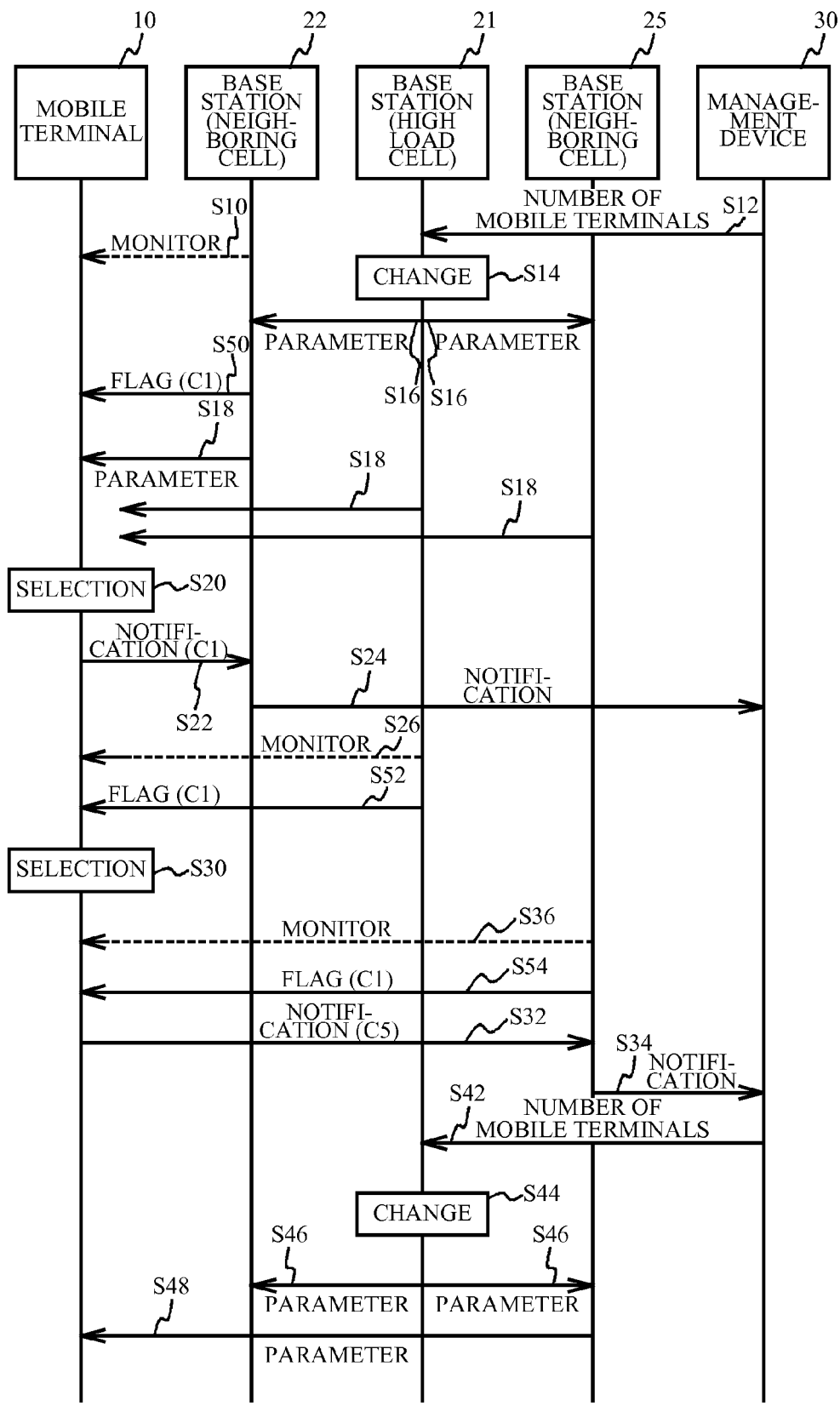
FIG. 11 is a sequence diagram of the mobile terminal, the base stations and the management device according to the second embodiment.

FIG. 11 is a sequence diagram of the mobile terminal, the base stations and the management device according to the second embodiment. Steps S50, S52 and S54 are added to FIG. 6 of the first embodiment. After step S16, the transmission unit 32 of the base station 22 broadcasts the flag 40 into the cell C2. That is, the transmission unit 32 of the base station 22 transmits the flag 40 to the reception unit 12 of the mobile terminal 10 (step S50). The cell which neighbors the cell C2 of the base station 22 is the high load cell C1. Therefore, the flag 40 includes the identifier 44 indicative of the high load cell C1. After step S26, the transmission unit 32 of the base station 21 broadcasts the flag 40 into the cell C1. That is, the transmission unit 32 of the base station 21 transmits the flag 40 to the reception unit 12 of the mobile terminal 10 (step S52). The cell C1 of the base station 21 is the high load cell. Therefore, the flag 40 includes the identifier 44 indicative of the high load cell C1.

After step S30, the reception unit 12 of the mobile terminal 10 monitors a signal from the base station 25 (step S36). The transmission 32 of the base station 25 transmits the flag 40 to the reception unit of the mobile terminal (step S54). The cell C1 which neighbors the base station 25 is the high load cell. Therefore, the flag 40 includes the identifier 44 indicative of the high load cell C1.

In addition, compared to FIG. 6, the notification message 46 which the notification unit 16 of the mobile terminal 10 transmits to the reception unit 34 of the base station 22 in step S22 includes the identifier 48 of the destination cell C1. In step S32, the notification message 46 which the notification unit 16 of the mobile terminal 10 transmits to the reception unit 34 of the base station 25 includes the identifier 48 of the destination cell C5. Although each of the base stations 21, 22 and 25 transmits the parameter in step S18, the mobile terminal 10 receives the parameter from the base station 22 of the cell C2 to which the mobile terminal 10 belongs. Since other processes are the same as FIG. 1 of the first embodiment, a description thereof is omitted.

Figure 12:
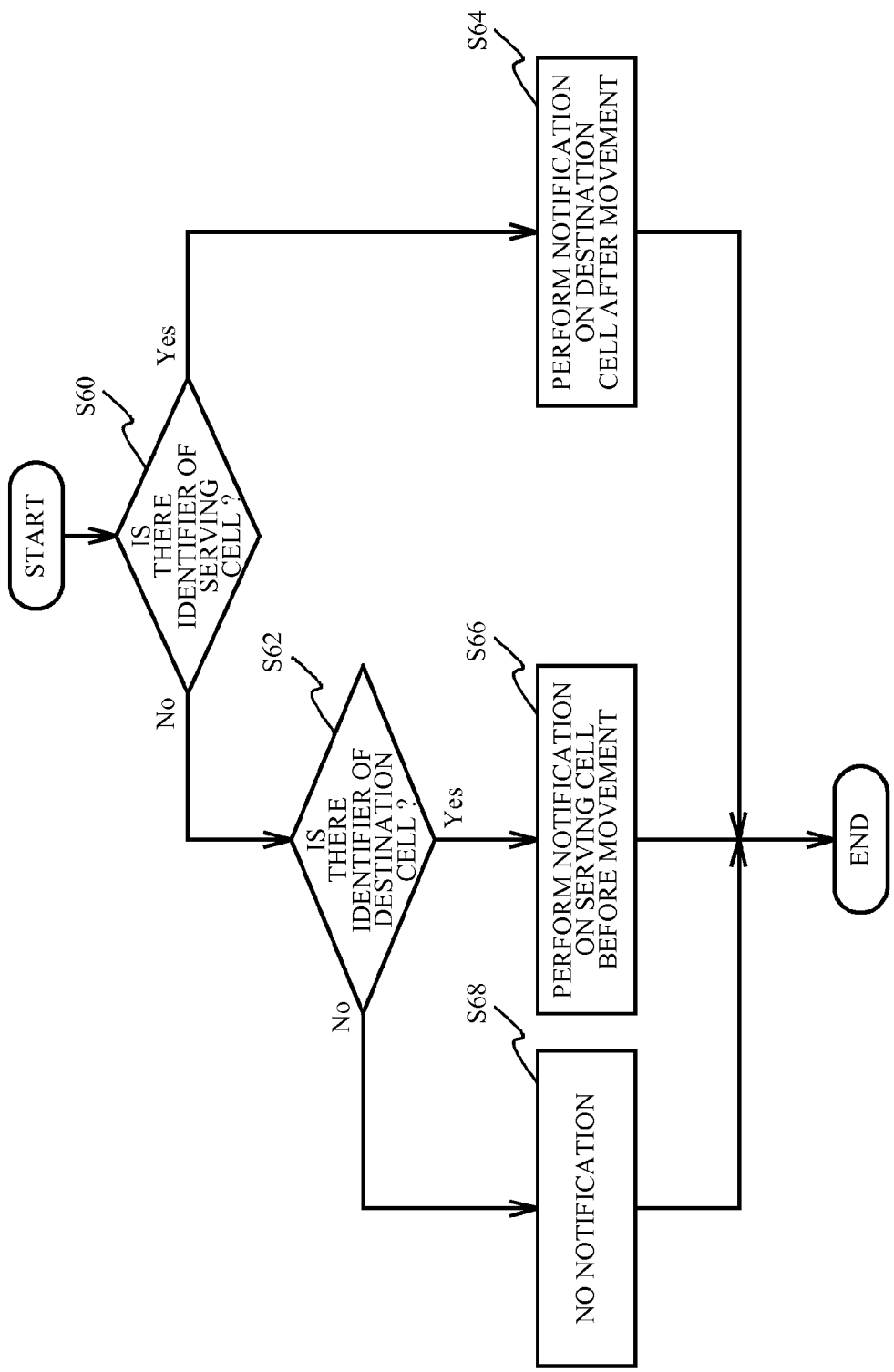
FIG. 12 is a flowchart illustrating a process which a selection unit of the mobile terminal performs in steps S20 and S30 of FIG. 11.

FIG. 12 is a flowchart illustrating a process which the selection unit 14 of the mobile terminal 10 performs in steps S20 and S30 of FIG. 11. The selection unit 14 determines whether the identifier 44 indicative of the serving cell is included in the flag 40 (step S60). When the determination is NO, the selection unit 14 determines whether the identifier 44 indicative of the destination cell is included in the flag 40 (step S62). When the determination is NO, the notification unit 16 does not notify the base station in the serving cell of information indicative of the destination cell (step S68). When the determination in step S62 is YES, the notification unit 16 notifies the base station in the serving cell of information indicative of the destination cell before the movement of the mobile terminal (step S66). When the determination in step S60 is YES, the notification unit 16 notifies the base station in the destination cell of information indicative of the destination cell after the movement of the mobile terminal (step S64).

For example, in step S20 of FIG. 11, the identifier 44 indicative of the serving cell C2 is not included in the flag 40. Therefore, step S60 of FIG. 12 is NO. In step S62, the identifier 44 indicative of the destination cell C1 is included in the flag 40. Therefore, step S62 is YES. Accordingly, in step S66, the notification unit 16 notifies the base station 22 of information indicative of the destination cell C1 before the mobile terminal 10 moves to the cell C1.

On the contrary, in step S30 of FIG. 11, the identifier 44 indicative of the serving cell C1 is included in the flag 40. Therefore, step S60 of FIG. 12 is YES. Accordingly, in step S64, the notification unit 16 notifies the base station 25 of information indicative of the destination cell C5 after the mobile terminal 10 moves to the cell C5. When the mobile terminal 10 does not move between the high load cell and the neighboring cells, the identifier 44 indicative of the serving cell and the identifier 44 indicative of the destination cell are not also included in the flag 40. Therefore, the notification unit 16 does not notify any base station of information indicative of the destination cell, as illustrated in step S68.

According to the second embodiment, when the mobile terminal 10 in the idle mode moves between the high load cell C1 and the neighboring cell C2 or C5, the transmission unit 32 of the base station device 20 transmits the flag 40 to the mobile terminal 10, as illustrated in steps S50 and S52 of FIG. 11. The flag 40 indicates whether to notify the base station 22 or 25 having the neighboring cell C2 or C5 of information indicative of the destination cell. Thereby, when the mobile terminal 10 moves between the high load cell C1 and the neighboring cell C2 or C5, the notification unit 16 of the mobile terminal 10 notifies the base station of information indicative of the destination cell. On the contrary, when the mobile terminal 10 moves between the cells other than the high load cell, the notification unit 16 does not notify the base station of information indicative of the destination cell.

Thereby, the base station can comprehend the movement of the mobile terminal in the idle mode between the high load cell in which the load should be reduced and the neighboring cells. On the other hand, since the base station does not receive the notification of the movement between the cells in which the load does not need to be reduced, the load of the base station can be reduced.

In addition, the base station device 20 can include the identification information indicative of the high load cell C1, and cannot include the identification information indicative of the neighboring cells C2 to C7. When the identification information indicative of the serving cell is included in the flag 40 as illustrated in step S60 of FIG. 12, the notification unit 16 of the mobile terminal notifies the base station in the destination cell of the information indicative of the destination cell after the mobile terminal moves to the neighboring cell, as illustrated in step S64. On the other hand, when the identification information indicative of the serving cell is not included in the flag 40 and the identification information indicative of the destination cell is included in the flag 40 as illustrated in steps S60 and S62, the notification unit 16 of the mobile terminal notifies the base station in the serving cell of the information indicative of the destination cell before the mobile terminal moves to a neighboring cell as the high load cell, as illustrated in step S66.

Thereby, the notification unit 16 of the mobile terminal 10 does not notify the base station 21 forming the high load cell C1 in which the load should be reduced of the information indicative of the destination cell. Therefore, the load of the base station 21 forming the high load cell C1 can be reduced more.

Embodiment 3

Figure 13:
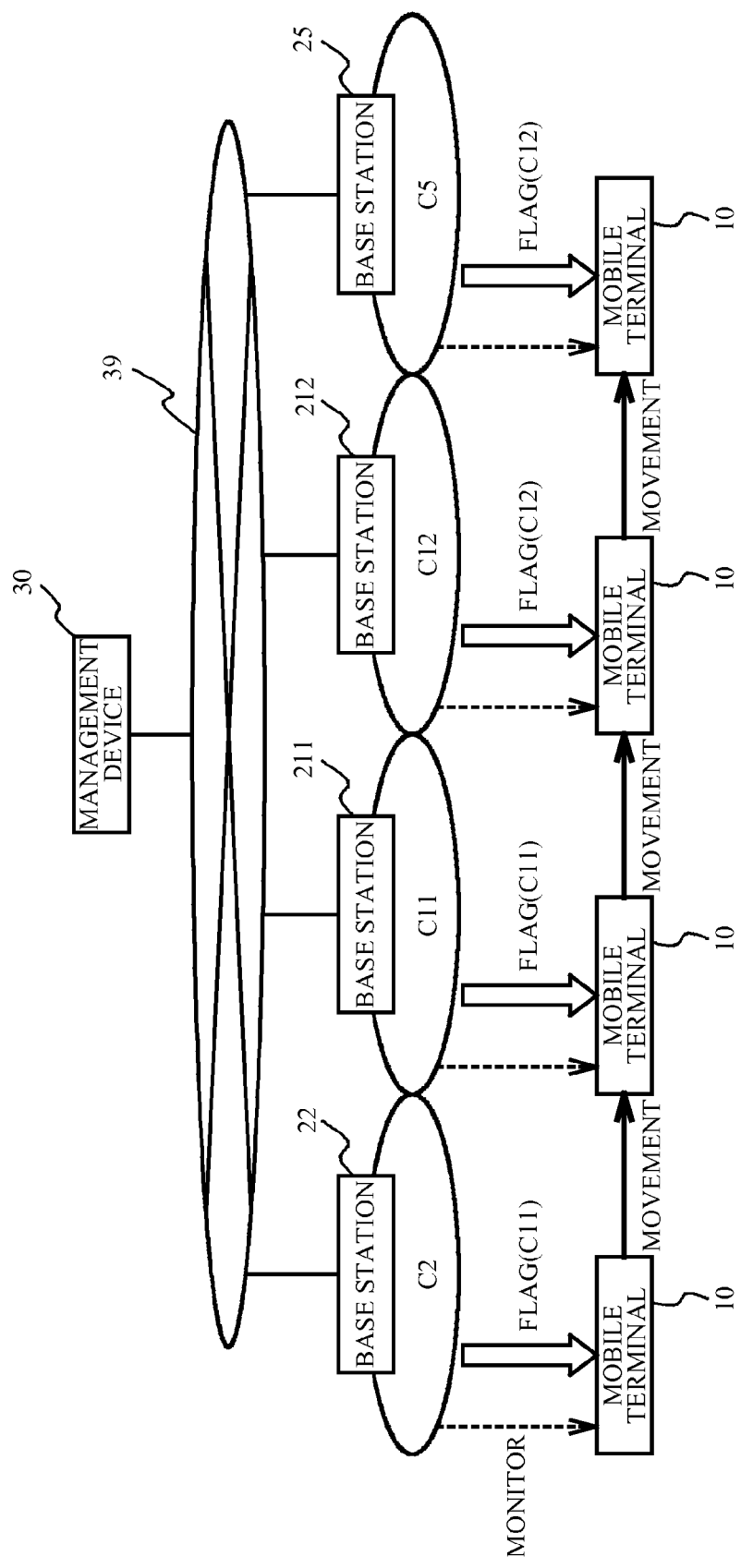
FIG. 13 is a block diagram of the communication system according to a third embodiment.

A third embodiment is an example of a case where the high load cells in which the load should be reduced are adjacent to each other. In addition, the third embodiment is an example of the case where the base station is not notified of the movement of the mobile terminal 10 in the idle mode from the high load cell to another high load cell. FIG. 13 is a block diagram of the communication system according to the third embodiment. The base stations 22, 211, 212, and 25 form the cell C2, C11, C12, and C5, respectively. The cells C11 and C12 are high load cells in which the load should be reduced. The cells C2 and C5 are neighboring cells which neighbor the high load cells C11 and C12. The base stations 22, 211, 212, and 25 are connected to the management device 30 via the backbone network 39. Each of the base stations 22 and 211 transmits the flag including an identifier of the cell 11 to the mobile terminal 10. On the other hand, each of the base stations 212 and 25 transmits the flag including an identifier of the cell C12.

As described above, in the third embodiment, even if the neighboring cell is a cell in which the load should be reduced, when a self-cell is the cell in which the load should be reduced, the identifier of the neighboring cell in which the load should be reduced is not included in the flag.

Figure 14:
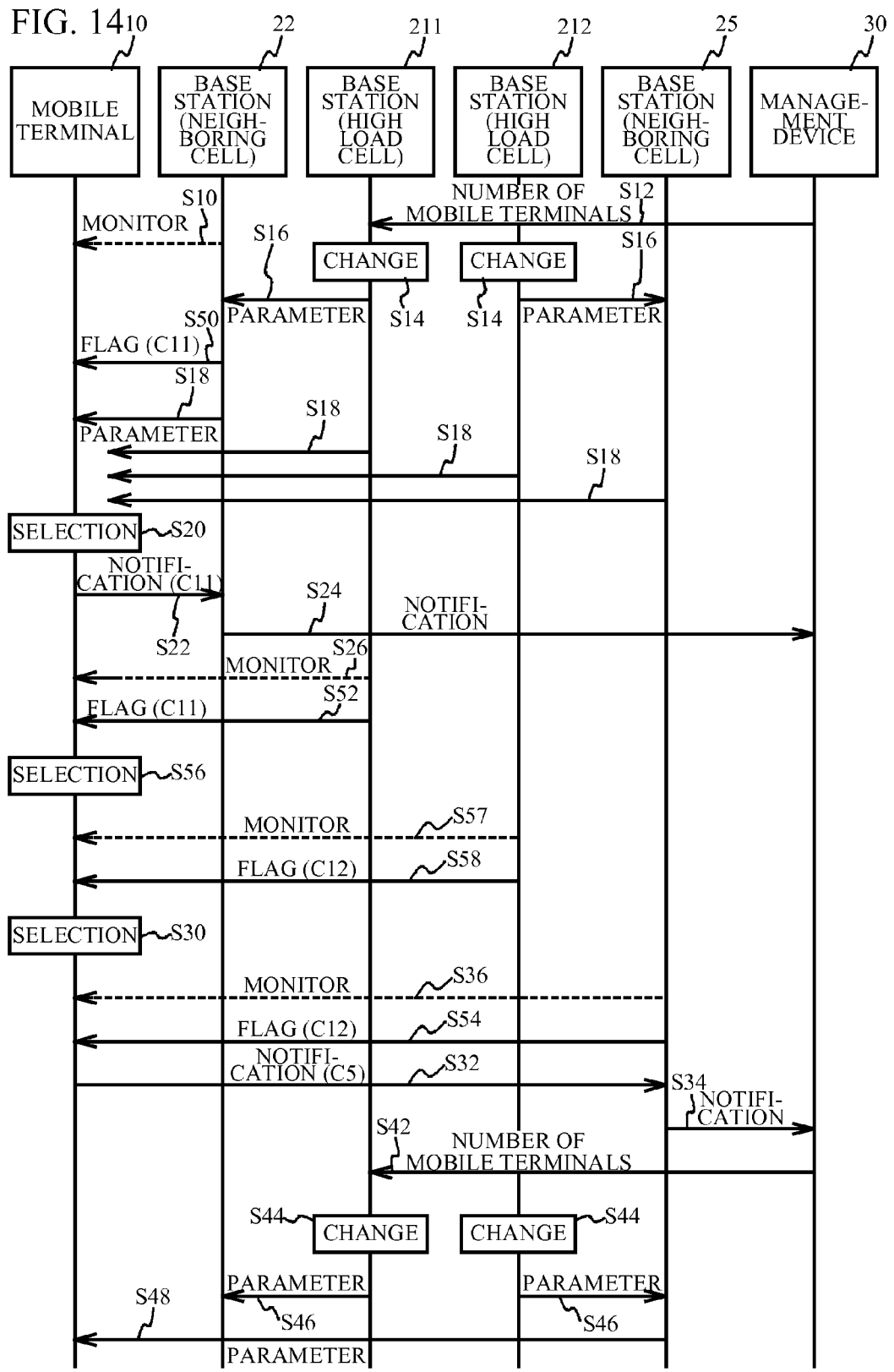
FIG. 14 is a sequence diagram of the mobile terminal, the base stations and the management device according to the third embodiment.

FIG. 14 is a sequence diagram of the mobile terminal, the base stations and the management device according to the third embodiment. The mobile terminal 10 belongs to the cell C2, and intermittently receives a signal from the base station 22 (step S10). The management device 30 transmits the number of mobile terminals to both of the base stations 211 and 212 (step S12). The changing units 36 of both of the base stations 211 and 212 change parameters (step S14). The transmission units 32 of the base stations 211 and 212 transmit the changed parameters to the base stations 22 and 25 adjacent to the base stations 211 and 212, respectively (step S16). The transmission unit 32 of the base station 22 transmits a flag including an identifier of the cell C11 to the reception unit 12 of the mobile terminal 10 (step S50). The transmission unit 32 of the base station 22 transmits the changed parameters to the reception unit 12 of the mobile terminal 10 (step S18). When the mobile terminal 10 moves near the cell C11, the selection unit 14 of the mobile terminal 10 selects the cell C11 based on the parameters received from the base station 22 (step S20).

The notification unit 16 of the mobile terminal 10 notifies the reception unit 34 of the base station 22 of information indicative of the destination cell C11 before the mobile terminal 10 move to the cell C11 (step S22). The base station 22 transmits the information indicative of the destination cell C11 to the management device 30 (step S24). Since the mobile terminal 10 moves to the cell C11, the reception unit 12 of the mobile terminal 10 intermittently receives a signal from the base station 211 (step S26). The transmission unit 32 of the base station 211 transmits the flag including the identifier of the cell C11 to the mobile terminal 10 (step S52). When the mobile terminal 10 moves near the cell C12, the selection unit 14 of the mobile terminal 10 selects the destination cell C12 based on the parameters (step S56). Since the mobile terminal 10 moves to the cell C12, the reception unit 12 of the mobile terminal 10 intermittently monitors a signal from the base station 212 (step S57). The transmission unit 32 transmits a flag including an identifier of the cell C12 to the reception unit 12 of the mobile terminal 10 (step S58). The notification unit 16 of the mobile terminal 10 does not notify any of the base stations 211 and 212 of information indicative of the destination cell C12.

When the mobile terminal 10 moves near the cell C5, the selection unit 14 of the mobile terminal 10 selects the destination cell c5 based on the parameters (step S30). Since the mobile terminal 10 moves to the cell C5, the reception unit 12 of the mobile terminal 10 intermittently monitors a signal from the base station 25 (step S36). The transmission unit 32 of the base station 25 transmits the flag including the identifier of the cell C12 to the reception unit 12 of the mobile terminal 10 (step S54). The notification unit 16 of the mobile terminal 10 notifies the base station 25 of information indicative of the destination cell C5 after the mobile terminal 10 moves to the cell C5 (step S32). The base station 25 transmits the information indicative of the destination cell C5 to the management device 30 (step S34). Steps 42 to S48 are the same as steps S12 to S18.

Figure 15:
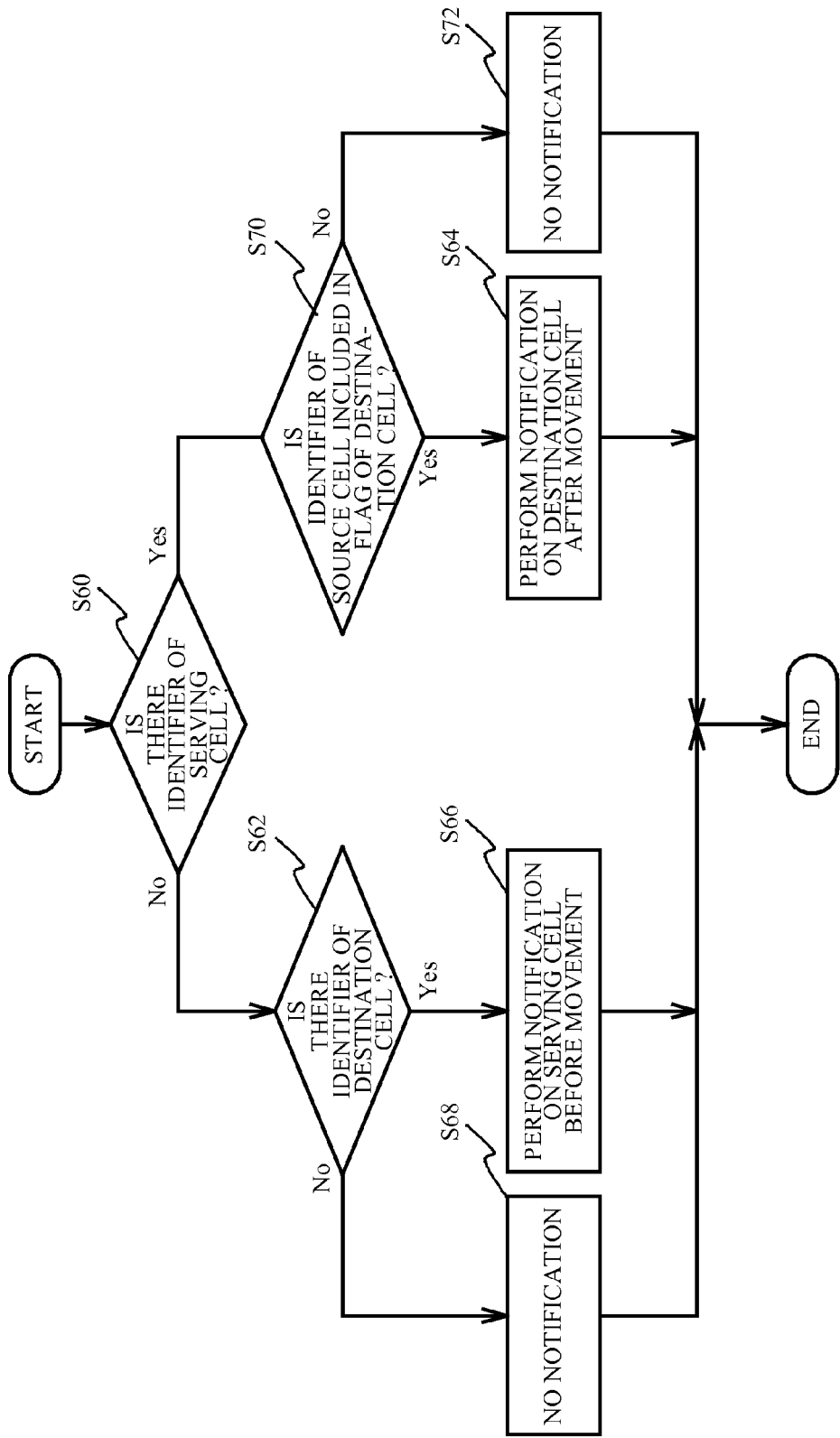
FIG. 15 is a flowchart illustrating a process which the selection unit of the mobile terminal performs in steps S20, S30 and S56 of FIG. 14.

FIG. 15 is a flowchart illustrating a process which the selection unit 14 of the mobile terminal 10 performs in steps S20, S30 and S56 of FIG. 14. When step S60 is YES, the selection unit 14 determines whether the identifier indicative of a source cell is included in the flag 40 to be transmitted in the destination cell (step S70). When step S70 is NO, the selection unit 14 does not notify any of the base stations of information indicative of the destination (step S72). When step S70 is YES, the notification unit 16 notifies the base station in the destination cell of the information indicative of the destination cell after the mobile terminal 10 moves to the destination cell (step S64). Since other processes are the same as FIG. 12 of the second embodiment, a description thereof is omitted.

For example, in step S20 of FIG. 14, the identifier 44 indicative of the serving cell C2 is not included in the flag 40.

Therefore, step S60 of FIG. 15 is NO. In step S62, the identifier 44 indicative of the destination cell C11 is included in the flag 40. Therefore, step S62 is YES. Consequently, in step S66, the notification unit 16 notifies the base station 22 of the information indicative of the destination cell C11 before the mobile terminal 10 moves to the cell C11.

In step S56 of FIG. 14, the identifier indicative of the serving cell C11 is included in the flag 40. Therefore, step S60 of FIG. 15 is YES. In step S70, the identifier 44 indicative of the source cell C11 is not included in the flag 40 to be transmitted in the destination cell C12. Therefore, step S70 is NO. Consequently, in step S72, the notification unit 16 does not notify any of the base stations of the information indicative of the destination cell.

In step S30 of FIG. 14, the identifier indicative of the serving cell C12 is included in the flag 40. Therefore, step S60 of FIG. 15 is YES. In step S70, the identifier of the cell C12 indicative of the source is included in the flag of the destination cell C5. Therefore, step S70 is YES. Consequently, in step S64, the notification unit 16 notifies the base station 25 of the information indicative of the destination cell C5 after the mobile terminal 10 moves to the cell C5.

According to the third embodiment, when the neighboring cell C12 adjacent to the high load cell C11 is the cell in which the load should be reduced, the notification unit 16 of the mobile terminal 10 does not notify the base station of the destination cell. That is, even if the base station itself is a base station forming the neighboring cell C12 adjacent to the high load cell C11, when the cell C12 is the high load cell, the reception unit 34 does not receive the information indicative of the destination cell.

In order to distribute the load of the high load cells, there is a case that the movement of the mobile terminal 10 in the idle mode between the high load cells (e.g. C11 and C12) need not be comprehended. On the other hand, when the base station forming the high load cell is notified of the movement of the mobile terminal 10 between the high load cells, the load of the cell in which the load should be reduced increases. In the third embodiment, the base station is not notified of the movement of the mobile terminal between the high load cells C11 and C12, the load of the base station can be reduced. Here, when the base station is notified of the movement of the mobile terminal 10 in the idle mode between the high load cells C11 and C12, the load of the base station increases, but more detailed distribution of the load is achieved. When there is such a strong request, the cell to which the mobile terminal 10 has moved can also be notified of the movement of the moving terminal 10 in the idle mode between the high load cells by performing the flowcharts of the second embodiment.

In the third embodiment, when the base station device 20 forms the high load cell C11 and the cell C12 (third cell) adjacent to the high load cell C11 is the high load cell, the transmission unit 32 of the base station device 20 can include the identification information indicative of the high load cell C11 in the flag, and cannot include the identification information indicative of the neighboring cells C2 and C5 and the high load cell C12 as the third cell, in the flag. When the identification information indicative of the serving cell is included in the flag and the identification information indicative of the serving cell is included in the flag received from the base station device of the destination, as illustrated in FIG. 15, step S64 is performed. That is, in this case, the notification unit 16 of the mobile terminal 10 notifies the base station of the information indicative of the destination cell after the mobile terminal 10 moves to the destination cell. On the other hand, when the identification information indicative of the serving cell is included in the flag and the identification information indicative of the serving cell is not included in the flag received from the base station device of the destination, step S72 is performed. That is, in this case, the notification unit 16 of the mobile terminal 10 does not notify the base station in the destination cell of the information indicative of the destination cell.

Thereby, when the cell C12 adjacent to the high load cell C11 is the high load cell, the notification unit 16 of the mobile terminal 10 cannot notify the base stations 211 and 212 forming the high load cells of the movement of the mobile terminal 10. Therefore, the loads of the base stations 211 and 212 provided in the high load cells C11 and C12 can be reduced.

Embodiment 4

Figure 16:
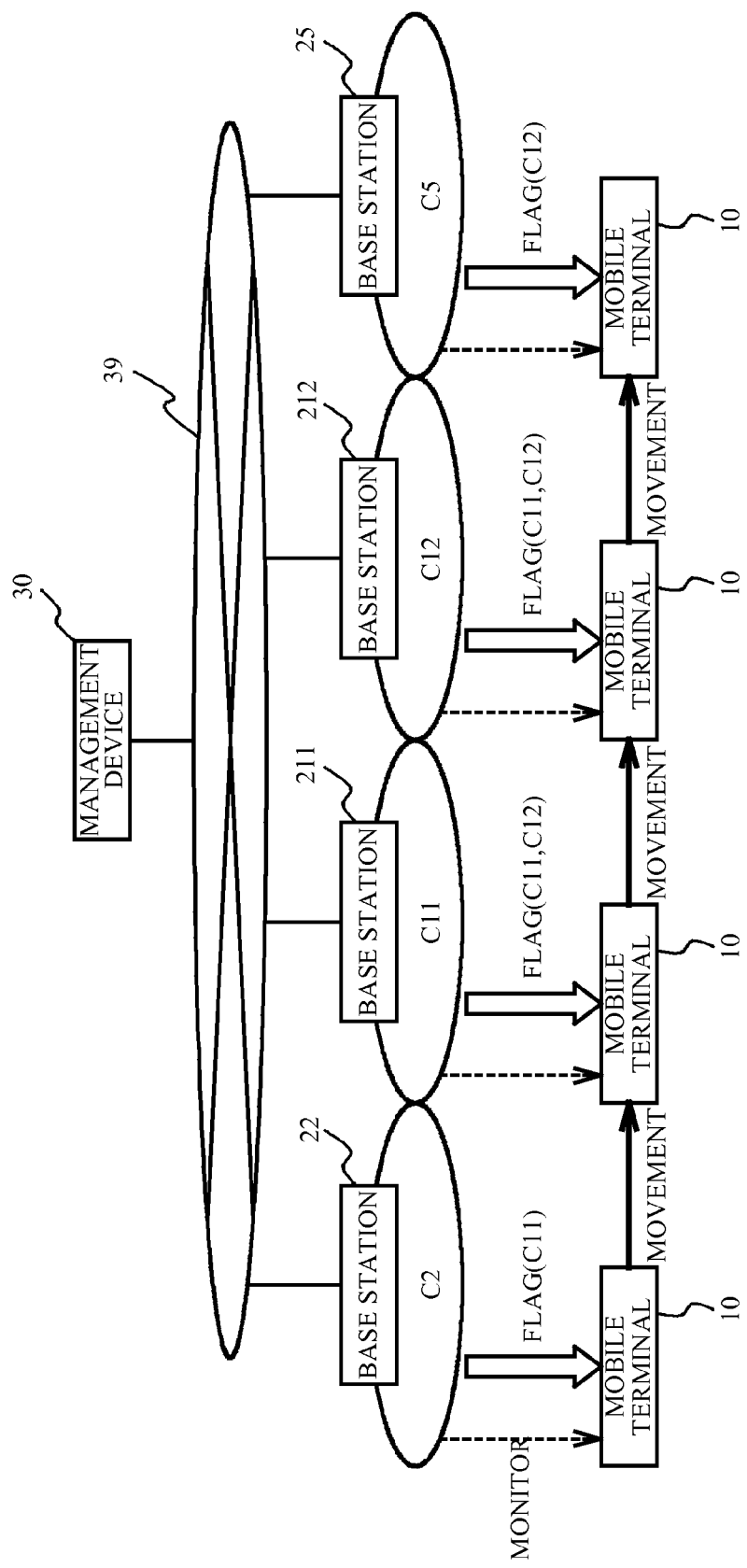
FIG. 16 is a block diagram of the communication system according to a fourth embodiment.

A fourth embodiment is another example of the case where the high load cells are adjacent to each other. FIG. 16 is a block diagram of the communication system according to the fourth embodiment. Compared to FIG. 13 of the third embodiment, the base station 22 transmits a flag including an identifier of the cell C11 to the mobile terminal 10. The base stations 211 and 212 transmit flags including identifiers of the cells C11 and 12 to the mobile terminals 10. The base station 25 transmits a flag including an identifier of the cell C12 to the mobile terminal 10. Since other configuration is the same as FIG. 13, a description thereof is omitted.

As described above, when the self-cell is the high load cell and the neighboring cell is the high load cell, the base station includes the identifiers of both of the self-cell and the neighboring high load cell in the flag.

Figure 17:
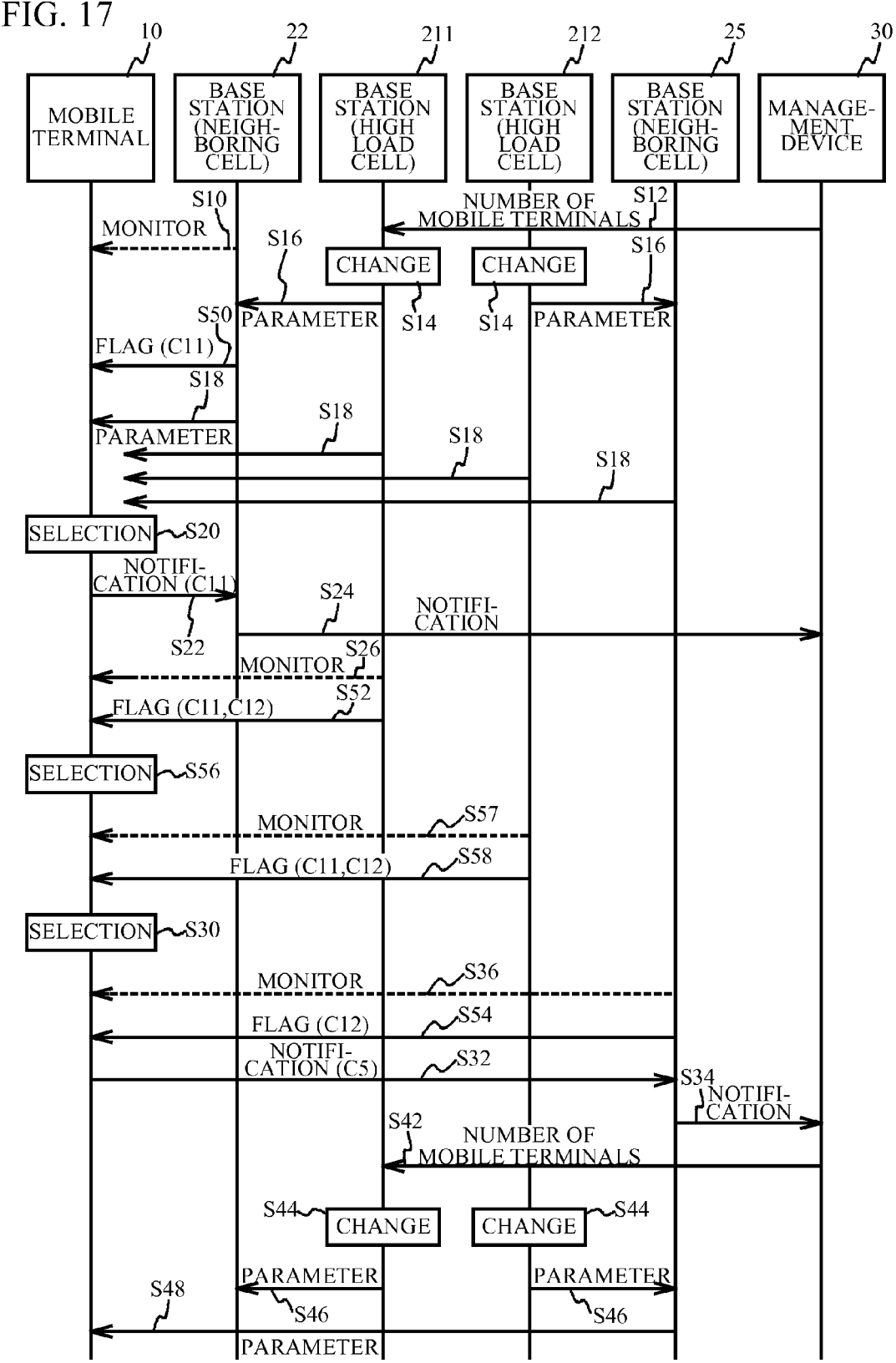
FIG. 17 is a sequence diagram of the mobile terminal, the base stations and the management device according to the fourth embodiment.

FIG. 17 is a sequence diagram of the mobile terminal, the base stations and the management device according to the fourth embodiment. Compared to FIG. 14 of the third embodiment, in steps S52 and S54, the identifiers of the cells C11 and C12 are included in the flag. Since other processes are the same as FIG. 14, a description thereof is omitted.

Figure 18:
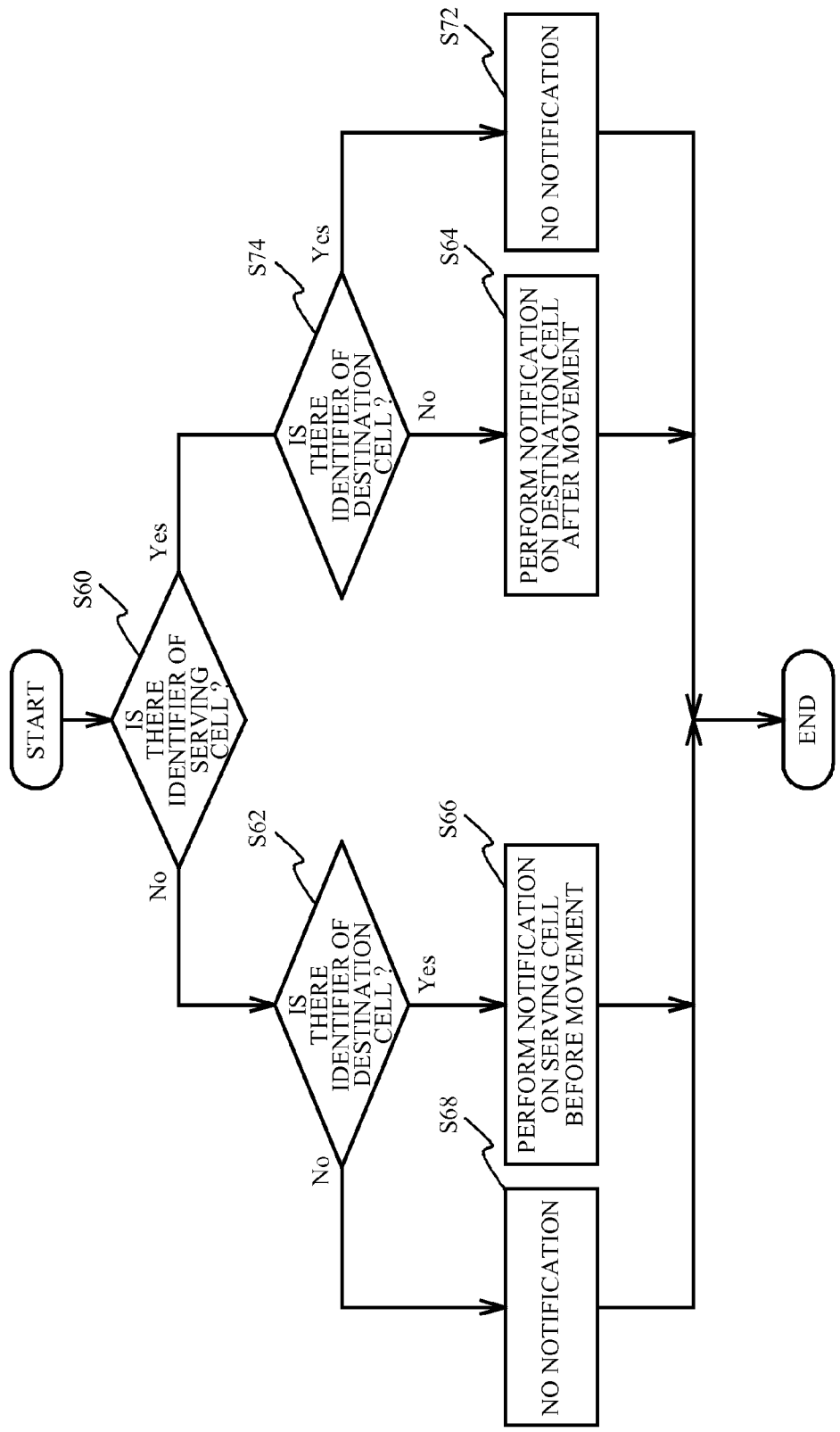
FIG. 18 is a flowchart illustrating a process which the selection unit of the mobile terminal performs in steps S20, S30 and S56 of FIG. 17.

FIG. 18 is a flowchart illustrating a process which the selection unit 14 of the mobile terminal 10 performs in steps S20, S30 and S56 of FIG. 17. When step S60 is YES, the selection unit 14 determines whether the identifier 44 indicative of the destination cell is included in the flag 40 (step S74). When step S74 is YES, the selection unit 14 does not notify any base station of information indicative of the destination (step S72). When step S74 is NO, the notification unit 16 notifies the base station in the destination cell of information indicative of the destination cell after the mobile terminal 10 moves to the destination cell (step S64). Since other processes are the same as FIG. 12 of the second embodiment, a description thereof is omitted.

In step S56 of FIG. 17, the identifier indicative of the serving cell C11 is included in the flag 40, for example. Therefore, step S60 of FIG. 18 is YES. In step S74, the identifier indicative of the destination cell C12 is included in the flag 40. Therefore, step S74 is YES. Accordingly, in step S72, the notification unit 16 does not notify any base station of information indicative of the destination cell.

In step S30 of FIG. 17, the identifier indicative of the serving cell C12 is included in the flag 40. Therefore, step S60 of FIG. 18 is YES. In step S74, the identifier indicative of the destination cell C12 is not included in the flag 40. Therefore, step S74 is NO. Accordingly, in step S64, the notification unit 16 notifies the base station 25 of information indicative of the destination cell C5 after the mobile terminal 10 move to the cell C5.

According to the fourth embodiment, when the base station device 20 forms the high load cell C11 and the cell C12 (third cell) adjacent to the high load cell C11 is also the high load cell, the transmission unit 32 of the base station device 20 includes the identifier indicative of the high load cells C11 and C12 in the flag. However, the transmission unit 32 does not include the identification information of the neighboring cells C2 and C5 in the flag. When the identification information of the serving cell is included in the received flag and the identifier indicative of the destination cell is included in the flag, the notification unit 16 of the mobile terminal 10 does not notify the base station of information indicative of the destination cell. On the other hand, when the identification information of the serving cell is included in the received flag and the identifier indicative of the destination cell is not included in the flag, the notification unit 16 notifies the base station in the destination cell of information indicative of the destination cell after the mobile terminal 10 moves to the destination cell.

Thereby, when the neighboring cell C12 adjacent to the high load cell C11 is the high load cell, the notification unit 16 of the mobile terminal 10 cannot notify the base stations 211 and 212 of the movement of the mobile terminal 10, as is the case with the third embodiment.

In the case of the third embodiment, the identifier included in the flag can be reduced. However, in the case of the third embodiment, the determination of step S70 of FIG. 15 is performed after the notification unit 16 of the mobile terminal 10 receives the flag of the destination in steps S58 and S54 of FIG. 14. On the other hand, in the case of the fourth embodiment, the determination of step S74 of FIG. 18 can be performed before the notification unit 16 receives the flag of the destination.

Embodiment 5

Figure 19:
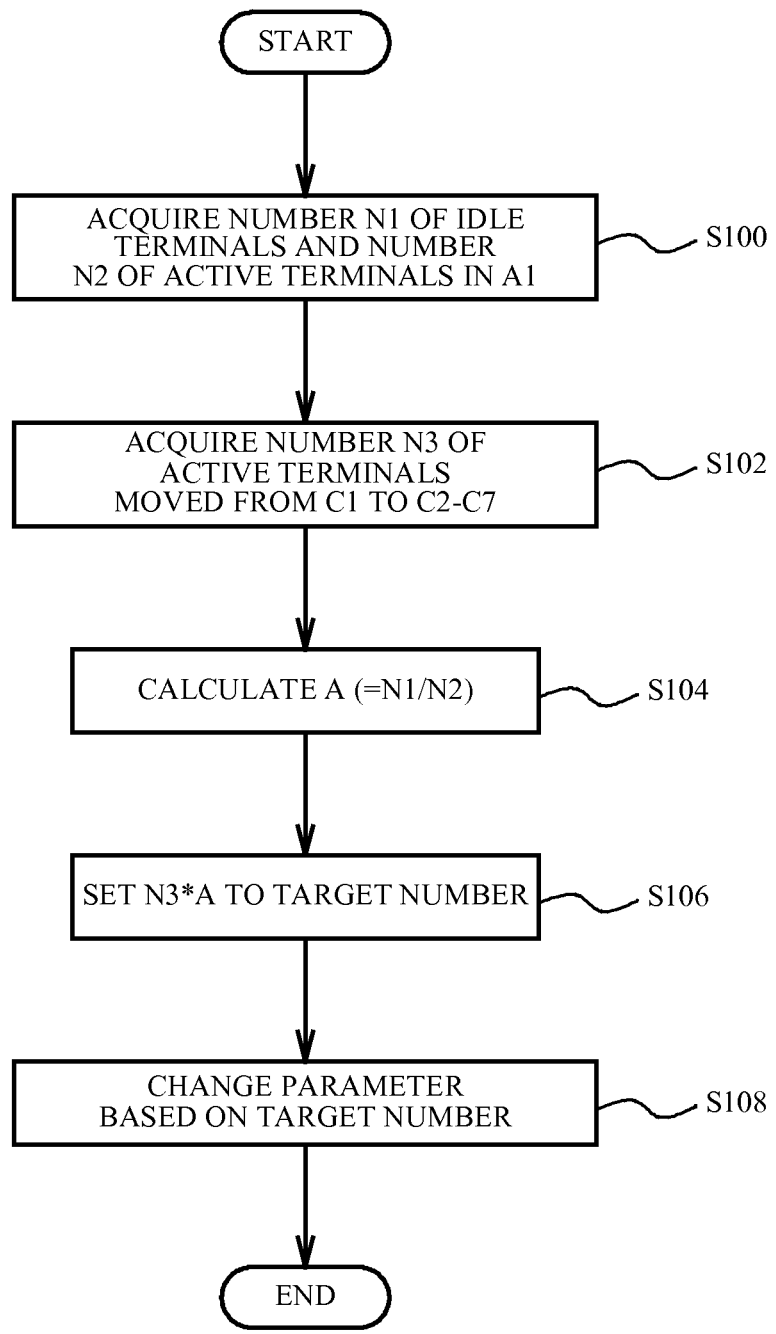
FIG. 19 is a flowchart illustrating a process of a changing unit according to a fifth embodiment.

A fifth embodiment is an example in which the changing unit 36 of the base station device 20 changes the parameters. FIG. 19 is a flowchart illustrating a process of the changing unit 36 according to the fifth embodiment. On the occasion of the handover, the mobile terminal in the active mode transmits information of the cell in which the handover is performed, to the base station. Therefore, the management device 30 can comprehend the movement of the mobile terminal 10 in the active mode between the cells. On the other hand, the management device 30 comprehends the number of mobile terminals 10 in the idle mode in the position registration range A1, based on the position registration about each mobile terminal 10. With reference to FIG. 19, the changing unit 36 acquires the total number N1 of mobile terminals in the idle mode and the total number N2 of mobile terminals in the active mode in the position registration range A1, from the management device 30 (step S100). In addition, the changing unit 36 acquires the number N3 of mobile terminals 10 in the active mode which have moved from the high load cell C1 to each neighboring cell C2 to C7, from the management device 30 (step S102). Steps S100 and S102 correspond to step S12 of FIG. 6 in the first embodiment, FIG. 11 in the second embodiment, FIG. 14 in the third embodiment, and FIG. 17 in the fourth embodiment.

The changing unit 36 calculates a ratio A of the number N1 of mobile terminals in the idle mode in the position registration range A1 to the number N2 of mobile terminals in the active mode in the position registration range A1 (step S104). The changing unit 36 sets "N3*A" to a target number of mobile terminals in the idle mode to be moved from the high load cell C1 to the neighboring cells C2 to C7 (step S106). The changing unit 36 changes the parameters based on the above-mentioned target number (step S108). For example, the changing unit 36 performs feedback control of the hysteresis and the offset as the parameters so that the movement number of mobile terminals 10 in the idle mode is the target number. Here, the movement number of mobile terminals 10 is the number of mobile terminals 10 which move between the cells. Steps S104 to S108 correspond to step S14 of FIG. 6 in the first embodiment, FIG. 11 in the second embodiment, FIG. 14 in the third embodiment, and FIG. 17 in the fourth embodiment. Each target number of mobile terminals in the idle mode which move from the high load cell C1 to each of the neighboring cells C2 to C7 may be set. A total of target number of mobile terminals in the idle mode which move from the high load cell C1 to any of the neighboring cells C2 to C7 may be set.

Figure 20:
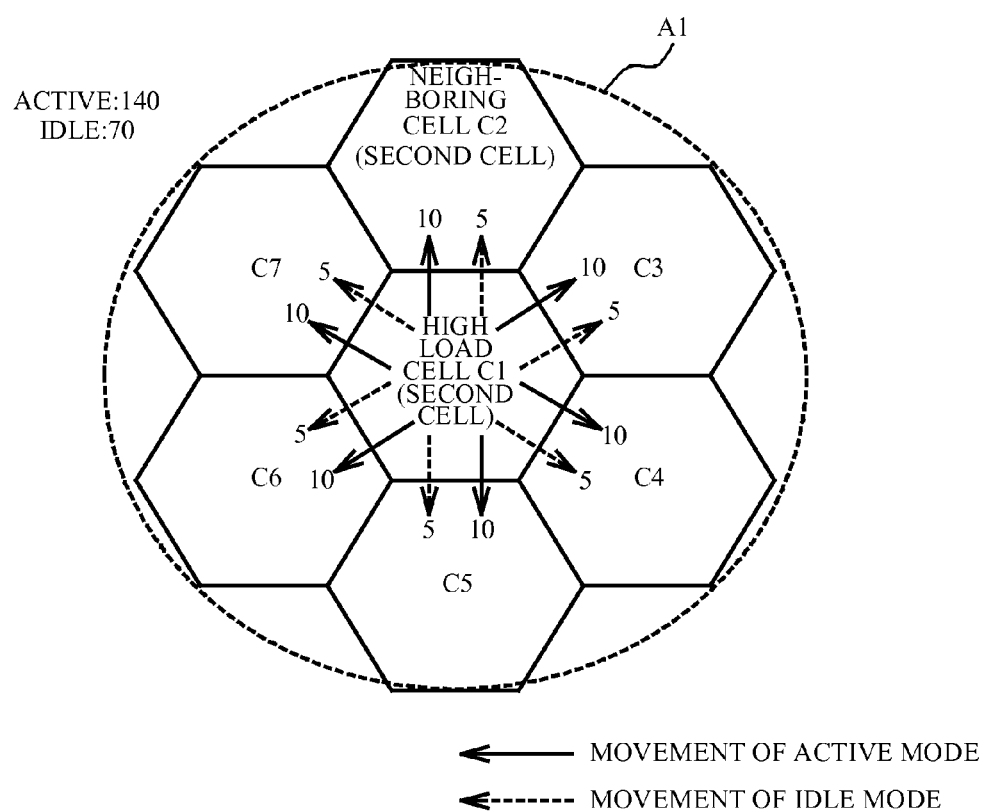
FIG. 20 is a diagram illustrating an example of a setting method of the target number of mobile terminals according to the fifth embodiment.

FIG. 20 is a diagram illustrating an example of a setting method of the target number of mobile terminals according to the fifth embodiment. As illustrated in FIG. 20, the cells C1 to C7 are included in the position registration range A1. The cell C1 is the high load cell. Solid line arrows and dotted line arrows from the high load cell C1 to the neighboring cells C2 to C7 indicate the movement of the mobile terminals 10 in the active mode and the idle mode, respectively. Here, the movement number of mobile terminals 10 in the active mode from the high load cell C1 to the neighboring cells C2 to C7 indicates a track record of the movement which the management device 30 has comprehended. The movement number of mobile terminals 10 in the idle mode from the high load cell C1 to the neighboring cells C2 to C7 indicates the target number which the changing unit 36 has set.

The total number N2 of mobile terminals 10 in the active mode in the position registration range A1 is 14, and the total number N1 of mobile terminals 10 in the idle mode is 70. Therefore, in step S104, the changing unit 36 calculates the ratio A (=N1/N2=0.5). The number N3 of mobile terminals 10 in the active mode which has moved from the high load cell C1 to the neighboring cell C2 is 10. Therefore, in step S106, the changing unit 36 sets the target number of mobile terminals in the idle mode to be moved from the high load cell C1 to the neighboring cell C2 to 5 (=10*0.5). The target number of mobile terminals in the idle mode to be moved from the high load cell C1 to the neighboring cells C3 to C7 is calculated in the same way. Here, FIG. 20 indicates an example in which the numbers of mobile terminals 10 in the active mode which has moved from the high load cell C1 to the respective neighboring cells C2 to C7 are the same as each other. As a matter of course, the numbers of mobile terminals 10 in the active mode which has moved from the high load cell C1 to the respective neighboring cells C2 to C7 may be different from each other.

With respect to the mobile terminal 10 in the active mode, the management device 30 comprehends the number of mobile terminals located at each cell. Therefore, with respect to the mobile terminal 10 in the active mode, it is possible to distribute the mobile terminal 10 from the high load cell C1 to the neighboring cells C2 to C7 in order to reduce the load of the high load cell C1. In the fifth embodiment, the changing unit 36 set the target number of the mobile terminals 10 in the idle mode which move between the high load cell C1 and each of the neighboring cells C2 to C7, based on the number N3 of the mobile terminal 10 in the active mode. Here, the number N3 is the number of mobile terminals 10 in the active mode which move between the high load cell C1 and each of the neighboring cells C2 to C7. The changing unit 36 changes the parameters based on the target number. Thereby, the changing unit 36 can set the parameters more properly.

Moreover, the changing unit 36 can change the parameters based on at least any of the number of mobile terminals in the idle mode which exist in the cell that the base station itself forms and the number of mobile terminals in the idle mode which exist in the neighboring cells, these numbers being guessed based on the number of mobile terminals in the idle mode or the active mode which move between the cell that the base station itself forms and the neighboring cells.
Embodiment 6

Figure 21:
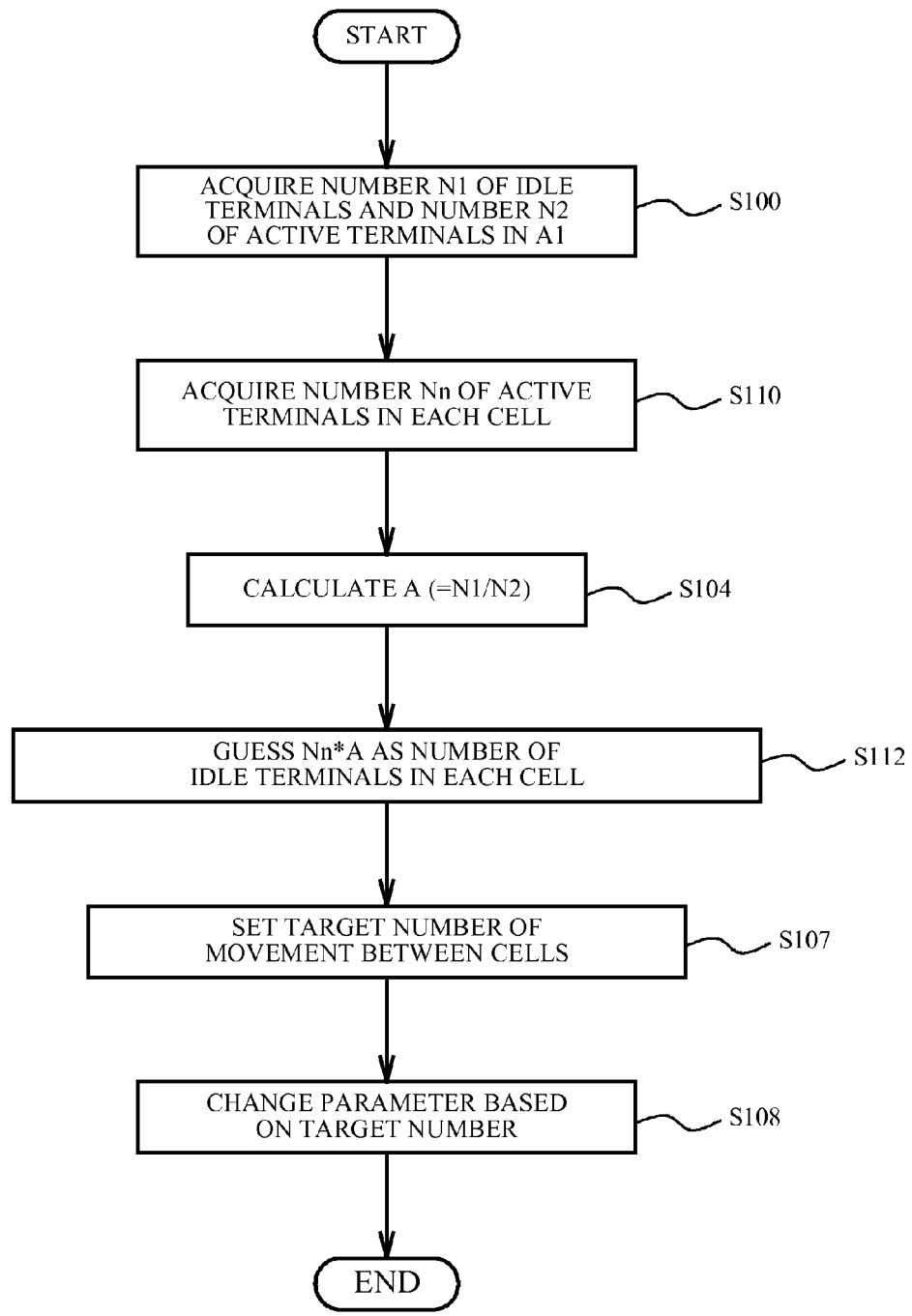
FIG. 21 is a flowchart illustrating a process of the changing unit according to a sixth embodiment.

A sixth embodiment is another example in which the changing unit 36 of the base station device 20 changes the parameters. FIG. 21 is a flowchart illustrating a process of the changing unit 36 according to the sixth embodiment. Compared to FIG. 19 of FIG. 5, the changing unit 36 acquires from the management device 30 the number Nn of mobile terminals 10 in the active mode which exist in each of the high load cell C1 and the neighboring cells C2 to C7 after step S100 (step S110). Steps S100 and S110 correspond to step S12 of FIG. 6 in the first embodiment, FIG. 11 in the second embodiment, FIG. 14 in the third embodiment, and FIG. 17 in the fourth embodiment.

After step S104, the changing unit 36 guesses "Nn*A" as the number of mobile terminals 10 in the idle mode in each of the cells C1 to C7 for each cell (step S112). The changing unit 36 sets the target number of mobile terminals in the idle mode which exist in each cell. For example, the changing unit 36 sets the target number of mobile terminals which move between the cells so that the numbers of mobile terminals in the respective cells C1 to C7 are the same as each other (step S107). Then, step S8 is performed. Steps S104 to S108 correspond to step S14 of FIG. 6 in the first embodiment, FIG. 11 in the second embodiment, FIG. 14 in the third embodiment, and FIG. 17 in the fourth embodiment. Since other processes are the same as FIG. 19 of the fifth embodiment, a description thereof is omitted.

Figure 22:
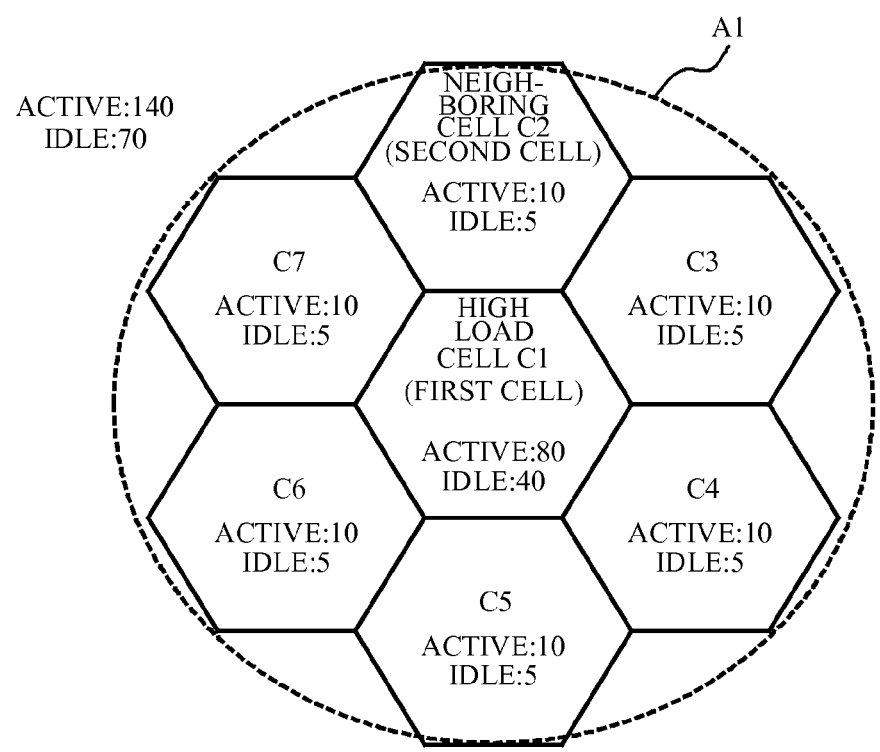
FIG. 22 is a diagram illustrating an example of a setting method of a target number of mobile terminals according to the sixth embodiment.

FIG. 22 is a diagram illustrating an example of a setting method of the target number of mobile terminals according to the sixth embodiment. As illustrated in FIG. 22, the cells C1 to C7 are included in the position registration range A1. The cell C1 is the high load cell. Numbers of the active and the idle in each cell indicate the numbers of mobile terminals 10 in the active mode and the idle mode in each cell, respectively. Here, the number of mobile terminals 10 in the active mode indicates the number of mobile terminals 10 in the cell which the management device 30 has comprehended. The number of mobile terminals 10 in the idle mode indicates the number of mobile terminals in each cell which the changing unit 36 has guessed.

The total number N2 of mobile terminals 10 in the active mode in the position registration range A1 is 140, and the total number N1 of mobile terminals 10 in the idle mode is 70. Therefore, in step S104, the changing unit 36 calculates the ratio A (=N1/N2=0.5). The number of mobile terminals 10 in the active mode in the high load cell C1 is 80. Therefore, the changing unit 36 guesses the number of mobile terminals in the active mode in the high load cell C1 as 40 (=80*0.5). The number of mobile terminals 10 in the idle mode in the neighboring cell C2 is 10. Therefore, the changing unit 36 guesses the number of mobile terminals 10 in the idle mode in the neighboring cell C2 as 5 (=10*0.5). The number of mobile terminals 10 in the idle mode in each of the neighboring cells C3 to C7 is guessed in the same way. Here, FIG. 22 indicates an example in which the numbers of mobile terminals 10 in the active mode in the neighboring cells C2 to C7 are the same as each other. As a matter of course, the numbers of mobile terminals 10 in the active mode in the neighboring cells C2 to C7 may be different from each other. The changing unit 36 sets the target number so that the target numbers of mobile terminals in the respective cells C1 to C7 are the same as each other. For example, the target number of mobile terminals in each of the cells C1 to C7 is 10. Therefore, the target number of mobile terminals to be moved from the cell C1 to each of the cells C2 to C7 is 5.

In the sixth embodiment, the changing unit 36 sets the target number of mobile terminals in the idle mode included in each of the cells based on the number Nn of mobile terminals in the active mode included in each of the cells in the position registration range A1 including the cells C1 to C7, and changes the parameters based on the set parameters. Thereby, the changing unit 36 can set the parameters more properly.

Moreover, the changing unit 36 can update the parameters based on at least any of the number of mobile terminals in the idle mode which exist in the cell that the base station itself forms and the number of mobile terminals in the idle mode which exist in the neighboring cells, these numbers being guessed based on the number of mobile terminals in the active mode which exist in each of the cell that the base station itself forms and the neighboring cells.

As described in the fifth and sixth embodiments, the changing unit 36 can change the values of the given parameters based on the number of mobile terminals in the first cell calculated with information indicative of the destination cell received from the mobile terminals in the idle mode.

In addition, the changing unit 36 can change the parameters based on at least any of the number of mobile terminals in the idle mode which exist in the cell that the base station itself forms or the number of mobile terminals in the idle mode which exist in the neighboring cells.
Embodiment 7

Figure 23:
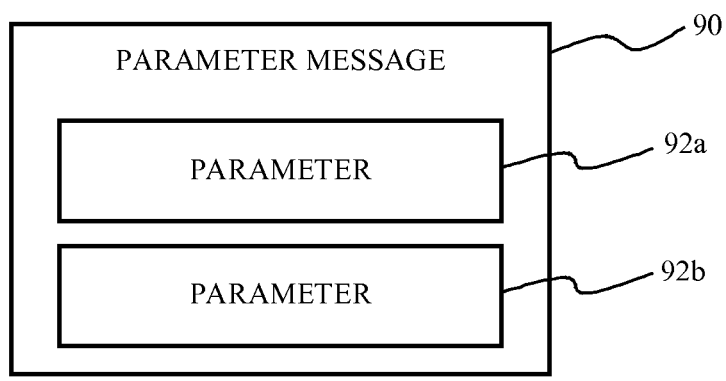
FIG. 23 is a diagram illustrating an example of a parameter message which a transmission unit of the base station device transmits to the mobile terminal according to a seventh embodiment.

A seventh embodiment is an example in which the changing unit 36 of the base station device 20 transmits parameters before and after it changes parameters to the mobile terminal 10. FIG. 23 is a diagram illustrating an example of a parameter message which the transmission unit 32 of the base station device 20 transmits to the mobile terminal 10. As illustrated in FIG. 23, a parameter 92a before the changing unit 36 changes and a parameter 92b after the changing unit 36 changes are included in a parameter 90.

Figure 24:
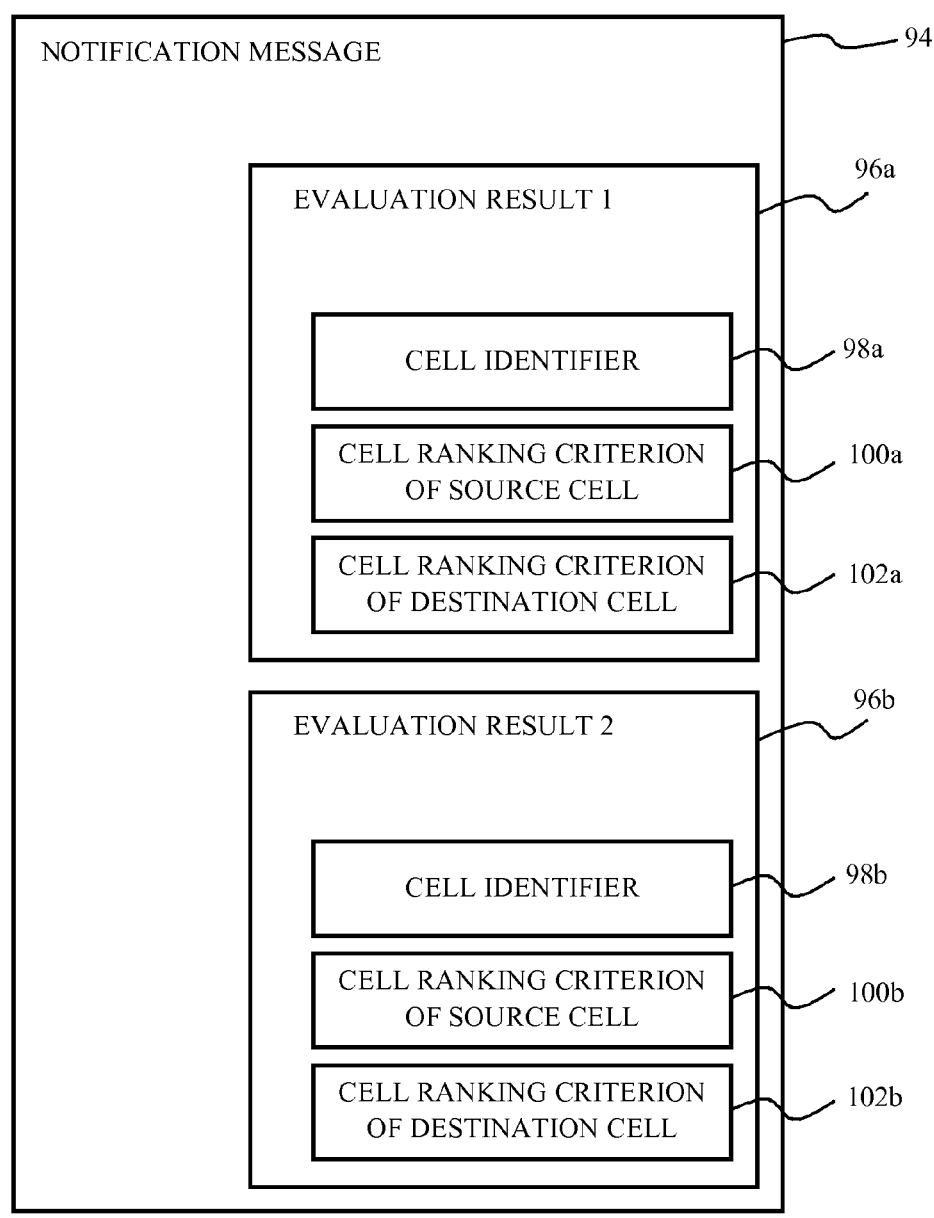
FIG. 24 is a diagram illustrating an example of a notification message of which the notification unit of the mobile terminal notifies the base station device.

FIG. 24 is a diagram illustrating an example of a notification message of which the notification unit 16 of the mobile terminal 10 notifies the base station device 20. As illustrated in FIG. 24, an evaluation result 96a in which the selection unit 14a of the mobile terminal has evaluated the cell based on the parameter 92a is included in a notification message 94. An identifier 98a of a cell selected based on the parameter 92a, a cell ranking criterion 100a of the source cell, and a cell ranking criterion 102a of the destination cell are included in the evaluation result 96a. An identifier 98b of a cell selected based on the parameter 92b, a cell ranking criterion 100b of the source cell, and a cell ranking criterion 102b of the destination cell are included in the evaluation result 96b.

According to the seventh embodiment, the changing unit 36 of the base station device 20 can change the parameters more highly. For example, since there are few mobile terminals 10 in the idle mode which move from the high load cell C1 to the neighboring cell C2 to C7, the changing unit 36 changes the parameters significantly. Thereby, a sufficient number of mobile terminals 10 can be moved from the high load cell C1 to the neighboring cell C2 to C7. However, it is assumed that, when the evaluation results 96a and 96b before and after the changing unit 36 changes the parameters are analyzed, the mobile terminal 10 tends to move to the neighboring cells C2 to C7 even when the parameter 92a before the change is used. In this case, it is thought that the timing in which the change unit 36 determines that there are few mobile terminals 10 which move to the neighboring cell C2 to C7 is too early. When the mobile terminals 10 extremely moves to the second cell, a possibility that sufficient reception quality is not obtained in the destination cell will increase. Therefore, it is not desirable to change the parameters significantly. According to the above-mentioned example, the change unit 36 can change the parameters properly.

Moreover, the change unit 36 can also change the parameters properly with the cell ranking criterions 100*a*, 100*b*, 102*a* and 102*b*.

It is noted that the embodiments of the present invention is applicable not only to the movement of the mobile terminals between the high load cell and its neighboring cells but the movement of other mobile terminals. That is, the first cell is not limited to the high load cell, and may be any cells in which comprehension of the movement of the mobile terminals is required, for example.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various change, substitutions, and alterations could be made hereto without departing from the spirit and scope of the invention.

What is claimed is:

1. A base station device comprising:
   a transmission portion that broadcast-transmits identification information indicating a first cell in which a load should be reduced to a mobile terminal in an idle mode under control of the base station device; and
   a reception portion that receives information indicating a destination cell transmitted from the mobile terminal in the idle mode when moving between cells;
   wherein when the base station device is a base station device forming a second cell in which a load does not need to be reduced adjacent to the first cell, the reception portion receives information indicating the second cell as the information indicating the destination cell from the mobile terminal in the idle mode which has received the identification information indicating the first cell transmitted from another base station device forming the first cell, and receives information indicating the first cell as the information indicating the destination cell from the mobile terminal in the idle mode which has received the identification information indicating the first cell transmitted from the base station device,
   wherein the mobile terminal in the idle mode does not notify the base station forming the first cell of the information indicating the destination cell before the mobile terminal in the idle mode moves from the first cell to the second cell, and the mobile terminal in the idle mode notifies the base station forming the second cell of the information indicating the destination after the mobile terminal in the idle mode moves from the first cell to the second cell, and
   wherein the mobile terminal in the idle mode notifies the base station forming the second cell of the information indicating the destination cell before the mobile terminal in the idle mode moves from the second cell to the first cell, and the mobile terminal in the idle mode does not notify the base station forming the first cell of the information indicating the destination cell after the mobile terminal in the idle mode moves from the second cell to the first cell.

2. The base station device as claimed in claim 1, wherein when the mobile terminal in the idle mode moves between the first cell and the second cell, the transmission portion transmits a flag including an identifier of the first cell as the identification information indicating the first cell,
   wherein the reception portion receives the information indicating the second cell as the information indicating the destination cell from the mobile terminal in the idle mode when the flag includes an identifier of a serving cell which the mobile terminal belongs to, and receives the information indicating the first cell as the information indicating a destination cell from the mobile terminal in the idle mode when the flag does not include the identifier of a serving cell and includes an identifier of the destination cell.

3. The base station device as claimed in claim 1, wherein the transmission portion transmits a given parameter used when the mobile terminal in the idle mode selects a cell, and the base station device further comprises a changing portion that changes a value of the given parameter based on a number of mobile terminals in the idle mode in the first cell, the number of mobile terminals being calculated with the information indicating the destination cell received from the mobile terminal in the idle mode.

4. The base station device as claimed in claim 3, wherein the changing portion sets a target number of mobile terminals in the idle mode which move between the first cell and the second cell based on a number of mobile terminals in an active mode which move between the first cell and the second cell, and changes the parameter based on the target number.

5. The base station device as claimed in claim 4, wherein the transmission portion transmits parameters before and after the changing portion changes, to the mobile terminal, and the mobile terminal notifies the base station device of the information indicating the destination cell selected based on each of the parameters before and after the change.

6. The base station device as claimed in claim 3, wherein the changing portion sets a target number of mobile terminals in the idle mode included in each of a plurality of cells based on a number of mobile terminals in an active mode included in each of the cells in a position registration range including the cells, and changes the parameter based on the target number.

7. A mobile terminal comprising:
   a reception portion that receives identification information indicating a first cell in which a load should be reduced from a base station device when the mobile terminal is in an idle mode; and
   a notification portion that notifies a base station device forming a second cell in which a load does not need to be reduced of information indicating the second cell as information indicating a destination cell when a serving cell to which the mobile terminal belongs is the first cell and the destination cell is the second cell adjacent to the first cell, and notifies the base station device forming the second cell of information indicating the first cell as the information indicating the destination cell when the serving cell is the second cell and the destination cell is the first cell,
   wherein the notification portion of the mobile terminal in the idle mode does not notify the base station forming the first cell of the information indicating the destination cell before the mobile terminal in the idle mode moves from the first cell to the second cell, and the notification portion of the mobile terminal in the idle mode notifies the base station forming the second cell of the information indicating the destination after the mobile terminal in the idle mode moves from the first cell to the second cell, and wherein the notification portion of the mobile terminal in the idle mode notifies the base station forming the second cell of the information indicating the destination cell before the mobile terminal in the idle mode moves from the second cell to the first cell, and the notification portion of the mobile terminal in the idle mode does not notify the base station forming the first cell of the information indicating the destination cell after the mobile terminal in the idle mode moves from the second cell to the first cell.

8. The mobile terminal as claimed in claim 7, wherein the reception portion receives from the base station device a flag including identification information of the first cell when the mobile terminal in the idle mode moves between the first cell and the second cell.

9. The mobile terminal as claimed in claim 8, wherein the notification portion notifies the base station device of the information indicating the destination cell when identification information of the serving cell is included in the flag, and notifies the base station device of the information indicating the destination cell when the identification information of the serving cell is not included in the flag and identification information of the destination cell is included in the flag.

10. The mobile terminal as claimed in claim 8, wherein the notification portion notifies the base station device of the information indicating the destination cell when identification information of the serving cell is included in the flag and identification information of the serving cell is included in a flag received from a base station device of the destination, and does not notify the base station device of the information indicating the destination cell when the identification information of the serving cell is included in the flag and the identification information of the serving cell is not included in the flag received from the base station device of the destination.

11. The mobile terminal as claimed in claim 8, wherein the notification portion does not notify the base station device of the information indicating the destination cell when the identification information of the serving cell is included in the flag and the identification information of the destination cell is included in the flag, and notifies the base station device of the information indicating the destination cell when the identification information of the serving cell is included in the flag and the identification information of the destination cell is not included in the flag.

12. A communication system including a mobile terminal and a base station device wirelessly communicating with the mobile terminal, comprising:
the base station device including:
a transmission portion that broadcast-transmits identification information indicating a first cell in which a load should be reduced to a mobile terminal in an idle mode under control of the base station device; and
a reception portion that receives information indicating a destination cell transmitted from the mobile terminal in the idle mode when moving between cells;
wherein when the base station device is a base station device forming a second cell in which a load does not need to be reduced adjacent to the first cell, the reception portion receives information indicating the second cell as the information indicating the destination cell from the mobile terminal in the idle mode which has received the identification information indicating the first cell transmitted from another base station device forming the first cell, and receives information indicating the first cell as the information indicating the destination cell from the mobile terminal in the idle mode which has received the identification information indicating the first cell transmitted from the base station device,
wherein the reception portion does not receive the information indicating the destination cell when the mobile terminal in the idle mode belongs to the first cell,
the mobile terminal including:
a reception portion that receives identification information indicating the first cell from the base station device when the mobile terminal is in the idle mode; and
a notification portion that notifies the base station device forming the second cell of information indicating the second cell as information indicating the destination cell when a serving cell to which the mobile terminal belongs is the first cell and the destination cell is the second cell, and notifies the base station device forming the second cell of information indicating the first cell as the information indicating the destination cell before the mobile terminal moves to the first cell when the serving cell is the second cell and the destination cell is the first cell,
wherein the notification portion of the mobile terminal in the idle mode does not notify the base station forming the first cell of the information indicating the destination cell before the mobile terminal in the idle mode moves from the first cell to the second cell, and the notification portion of the mobile terminal in the idle mode notifies the base station forming the second cell of the information indicating the destination cell after the mobile terminal in the idle mode moves from the first cell to the second cell, and
wherein the notification portion of the mobile terminal in the idle mode notifies the base station forming the second cell of the information indicating the destination cell before the mobile terminal in the idle mode moves from the second cell to the first cell, and the notification portion of the mobile terminal in the idle mode does not notify the base station forming the first cell of the information indicating the destination cell after the mobile terminal in the idle mode moves from the second cell to the first cell.

13. A radio communication method of a base station device wirelessly communicating with a mobile terminal, comprising:
broadcast-transmitting identification information indicating a first cell in which a load should be reduced to a mobile terminal in an idle mode under control of the base station device;
receiving information indicating a destination cell that the mobile terminal in the idle mode transmits when moving between cells;
receiving, when the base station device is a base station device forming a second cell in which a load does not need to be reduced adjacent to the first cell, information indicating the second cell as the information indicating the destination cell from the mobile terminal in the idle mode which has received the identification information indicating the first cell transmitted from another base station device forming the first cell;
receiving, when the base station device is the base station device forming the second cell adjacent to the first cell, information indicating the first cell as the information indicating the destination cell from the mobile terminal in the idle mode which has received the identification information indicating the first cell transmitted from the base station device;
wherein the mobile terminal in the idle mode does not notify the base station forming the first cell of the information indicating the destination cell before the mobile terminal in the idle mode moves from the first cell to the second cell, and the mobile terminal in the idle mode notifies the base station forming the second cell of the information indicating the destination cell after the mobile terminal in the idle mode moves from the first cell to the second cell, and wherein the mobile terminal in the idle mode notifies the base station forming the second cell of the information indicating the destination cell before the mobile terminal in the idle mode moves from the second cell to the first cell, and the mobile terminal in the idle mode does not notify the base station forming the first cell of the information indicating the destination cell after the mobile terminal in the idle mode moves from the second cell to the first cell.

14. A radio communication method of a mobile terminal wirelessly communicating with a base station device, comprising:

receiving identification information indicating a first cell in which a load should be reduced from the base station device when the mobile terminal is in an idle mode;

notifying a base station device forming a second cell in which a load does not need to be reduced of information indicating the second cell as information indicating a destination cell when a serving cell to which the mobile terminal belongs is the first cell and the destination cell is the second cell adjacent to the first cell, notifying the base station device forming the second cell of information indicating the first cell as the information indicating the destination cell when the serving cell is the second cell and the destination cell is the first cell;

wherein the mobile terminal in the idle mode does not notify the base station forming the first cell of the information indicating the destination cell before the mobile terminal in the idle mode moves from the first cell to the second cell, and the mobile terminal in the idle mode notifies the base station forming the second cell of the information indicating the destination cell after the mobile terminal in the idle mode moves from the first cell to the second cell, and wherein the mobile terminal in the idle mode notifies the base station forming the second cell of the information indicating the destination cell before the mobile terminal in the idle mode moves from the second cell to the first cell, and the mobile terminal in the idle mode does not notify the base station forming the first cell of the information indicating the destination cell after the mobile terminal in the idle mode moves from the second cell to the first cell.

* * * * *